United States Patent
Medra et al.

(10) Patent No.: US 11,848,709 B2
(45) Date of Patent: Dec. 19, 2023

(54) MEDIA-BASED RECONFIGURABLE INTELLIGENT SURFACE-ASSISTED MODULATION

(71) Applicants: Mostafa Medra, Kanata (CA); Mohammadhadi Baligh, Ottawa (CA); Ahmad Abu Al Haija, Ottawa (CA)

(72) Inventors: Mostafa Medra, Kanata (CA); Mohammadhadi Baligh, Ottawa (CA); Ahmad Abu Al Haija, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/994,079

(22) Filed: Aug. 14, 2020

(65) Prior Publication Data
US 2022/0052764 A1 Feb. 17, 2022

(51) Int. Cl.
H04B 10/556 (2013.01)
H04L 27/38 (2006.01)
H04B 10/54 (2013.01)
H04B 10/61 (2013.01)

(52) U.S. Cl.
CPC ....... H04B 10/5561 (2013.01); H04B 10/541 (2013.01); H04B 10/614 (2013.01); H04L 27/38 (2013.01)

(58) Field of Classification Search
CPC .............. H04B 10/5561; H04B 10/541; H04B 10/614; H04B 7/04013; H04B 7/0617; H04L 27/38
See application file for complete search history.

(56) References Cited

U.S. PATENT DOCUMENTS 5,473,428 A * 12/1995 Lee .................... G01K 11/3206
374/162
9,379,873 B2 * 6/2016 Kang ................... H04B 7/0456
9,490,535 B2 * 11/2016 Boutayeb ........... H01Q 21/0037
(Continued)

FOREIGN PATENT DOCUMENTS

CA 2893832 A1 * 10/2014 .......... H04B 7/0413
CN 110336575 A 10/2019
(Continued)

OTHER PUBLICATIONS

S. Lin et al., "Reconfigurable Intelligent Surfaces With Reflection Pattern Modulation: Beamforming Design and Performance Analysis," in IEEE Transactions on Wireless Communications, vol. 20, No. 2, pp. 741-754, Date of Publication: Oct. 8, 2020 (Year: 2020).*
(Continued)

*Primary Examiner* — Berhanu Tadese

(57) ABSTRACT

The present disclosure provides methods and devices that use the RIS phase shifting ability to provide many degrees of freedom to enable data to be overlaid on transmitted signals. The data overlay is done while the RIS is still beamforming the signal towards the receiver(s). The phase shifting capabilities of the RIS elements can provide amplitude, phase, frequency, and polarization manipulations. These manipulations can help enhance the communication and provide the ability to overlay information. The present application also provides new configuration signaling among devices in a communication network utilizing the RIS and configuration for the RIS.

20 Claims, 12 Drawing Sheets

(56) References Cited

U.S. PATENT DOCUMENTS

| | | | |
|---|---|---|---|
| 9,838,184 B2 * | 12/2017 | Kang | H04W 24/10 |
| 11,251,537 B2 * | 2/2022 | Sciancalepore | H01Q 15/148 |
| 11,431,103 B2 * | 8/2022 | Baligh | H01Q 3/46 |
| 2015/0380815 A1 * | 12/2015 | Boutayeb | H01Q 21/20 343/777 |
| 2018/0176869 A1 * | 6/2018 | Aryafar | H04B 7/0695 |
| 2018/0309533 A1 * | 10/2018 | Yoshimoto | H04L 27/26025 |
| 2019/0013912 A1 * | 1/2019 | Tomeba | H04W 72/04 |
| 2019/0014568 A1 * | 1/2019 | Nilsson | H04B 7/088 |
| 2019/0207664 A1 | 7/2019 | Kwak et al. | |
| 2019/0223118 A1 * | 7/2019 | Tomeba | H04W 24/10 |
| 2021/0068163 A1 * | 3/2021 | Lee | H04W 74/006 |
| 2021/0126359 A1 * | 4/2021 | Kim | H01Q 3/46 |
| 2021/0167512 A1 * | 6/2021 | Lee | H04B 7/0408 |
| 2021/0302561 A1 * | 9/2021 | Bayesteh | G01S 13/765 |
| 2021/0359891 A1 * | 11/2021 | Lee | H04B 7/0456 |
| 2021/0384637 A1 * | 12/2021 | Sciancalepore | H01Q 15/148 |
| 2021/0384958 A1 * | 12/2021 | Denis | H04B 7/145 |
| 2022/0014935 A1 * | 1/2022 | Haija | H04L 5/0048 |
| 2022/0052764 A1 * | 2/2022 | Medra | H04B 10/541 |

FOREIGN PATENT DOCUMENTS

| | | | | |
|---|---|---|---|---|
| CN | 111010219 A | * | 4/2020 | |
| CN | 111416646 A | * | 7/2020 | H04B 7/04 |
| CN | 111416646 A | | 7/2020 | |
| CN | 111542054 A | * | 8/2020 | H04W 12/03 |
| CN | 111698046 A | * | 9/2020 | |
| CN | 111010219 B | * | 11/2020 | |
| CN | 111884692 A | * | 11/2020 | H04B 7/0413 |
| CN | 111983560 A | * | 11/2020 | G01S 11/06 |
| CN | 112100572 A | * | 12/2020 | G06F 17/16 |
| CN | 112153653 A | * | 12/2020 | |
| CN | 112260740 A | * | 1/2021 | H04B 7/0617 |
| CN | 112260975 A | * | 1/2021 | H04B 17/336 |
| CN | 112272384 A | * | 1/2021 | H04W 24/02 |
| CN | 112272418 A | * | 1/2021 | H04W 76/14 |
| CN | 112383332 A | * | 2/2021 | H04B 7/0452 |
| CN | 112491773 A | * | 3/2021 | H04B 7/0857 |
| CN | 112564752 A | * | 3/2021 | |
| CN | 112782652 A | * | 5/2021 | |
| CN | 111884692 B | * | 6/2021 | H04B 7/0413 |
| CN | 112954690 A | * | 6/2021 | H04B 7/0617 |
| CN | 112969225 A | * | 6/2021 | H04B 7/145 |
| CN | 113163497 A | * | 7/2021 | H04W 72/0493 |
| CN | 113189902 A | * | 7/2021 | |
| CN | 113193894 A | * | 7/2021 | H04B 7/0456 |
| CN | 113206391 A | * | 8/2021 | |
| CN | 113225275 A | * | 8/2021 | H04B 7/145 |
| CN | 113271597 A | * | 8/2021 | H04W 24/02 |
| CN | 113286292 A | * | 8/2021 | H04W 12/02 |
| CN | 113300747 A | * | 8/2021 | H04B 17/391 |
| CN | 113315607 A | * | 8/2021 | H04L 1/1812 |
| CN | 113381953 A | * | 9/2021 | |
| CN | 113411835 A | * | 9/2021 | |
| CN | 113422628 A | * | 9/2021 | |
| CN | 113452642 A | * | 9/2021 | |
| CN | 113472419 A | * | 10/2021 | |
| CN | 113472705 A | * | 10/2021 | |
| CN | 113573293 A | * | 10/2021 | |
| EP | 2984768 B1 | * | 5/2019 | H04B 7/0421 |
| EP | 2984865 B1 | * | 6/2019 | H04B 7/0413 |
| EP | 2957046 B1 | * | 9/2020 | H04B 7/0413 |
| EP | 3919929 A1 | * | 12/2021 | G01S 5/0205 |
| EP | 3919929 A4 | * | 12/2021 | G01S 5/0205 |
| EP | 4014333 A1 | * | 6/2022 | H04B 7/026 |
| FR | 3099670 A1 | * | 2/2021 | H04B 5/0031 |
| JP | 63316820 A | * | 12/1988 | |
| JP | 2004085437 A | * | 3/2004 | |
| JP | 2004170462 A | * | 6/2004 | |
| JP | 2020064231 A | * | 4/2020 | B41J 2/471 |
| JP | 2020064232 A | * | 4/2020 | B41J 2/471 |
| WO | WO-2014168315 A1 | * | 10/2014 | H04B 7/0413 |
| WO | WO-2014168317 A1 | * | 10/2014 | H04B 7/0413 |
| WO | WO-2014168319 A1 | * | 10/2014 | H04B 7/0421 |
| WO | WO-2016153112 A1 | * | 9/2016 | H04B 7/04 |
| WO | WO-2018071026 A1 | * | 4/2018 | |
| WO | WO-2018106260 A1 | * | 6/2018 | |
| WO | WO-2019007483 A1 | * | 1/2019 | H04B 7/0456 |
| WO | WO-2021023928 A1 | * | 2/2021 | H04B 5/0031 |
| WO | WO-2021109345 A1 | * | 6/2021 | H04B 7/145 |
| WO | WO-2021155927 A1 | * | 8/2021 | H04B 7/0604 |
| WO | WO-2021215884 A1 | * | 10/2021 | H04W 24/08 |
| WO | WO-2021236510 A1 | * | 11/2021 | H04B 7/026 |
| WO | WO-2021237688 A1 | * | 12/2021 | H04B 7/0617 |
| WO | WO-2021239067 A1 | * | 12/2021 | |
| WO | WO-2021239311 A1 | * | 12/2021 | H04B 7/0456 |
| WO | WO-2021252858 A1 | * | 12/2021 | H01Q 15/14 |
| WO | WO-2021254078 A1 | * | 12/2021 | |
| WO | WO-2022007417 A1 | * | 1/2022 | H04B 17/318 |
| WO | WO-2022012040 A1 | * | 1/2022 | H01Q 15/148 |
| WO | WO-2022015965 A1 | * | 1/2022 | |
| WO | WO-2022019707 A1 | * | 1/2022 | H04W 72/0406 |

OTHER PUBLICATIONS

S. Lin et al., Adaptive Transmission for Reconfigurable Intelligent Surface-Assisted OFDM Wireless Communications, Date of Publication: Jul. 3, 2020 (Year: 2020).*

Yan et al. Large Intelligent Surface Aided Multiuser MIMO_ Passive Beamforming and Information Transfer, IEEE 2020 (Year: 2020).*

WO2021109345, Intelligent Reflecting devices configured to reflect an incident signal. the reflected signal is modulated and have characteristics that indicate to the receiving device the signal was reflected. (Year: 2021).*

Large Intelligent Surface Aided Multiuser MIMO_ Passive Beamforming and Information Transfer, IEEE 2020 (Year: 2020).*

Liu et al., Intelligent Reflecting Surface Based Passive Information Transmission, IEEE, Jul. 2021 (Year: 2021).*

Ozdogan et al., Intelligent Reflecting Surfaces, IEEE, Dec. 2019 (Year: 2019).*

Basar et al. Wireless Communications Through Reconfigurable Intelligent Surfaces, IEEE, Aug. 2019 (Year: 2019).*

M. Wu et al. Reconfigurable Intelligent Surface Assisted Spatial Modulation for Symbiotic Radio, IEEE, Oct. 2021 (Year: 2021).*

Yan, Wenjing, et al., "Passive Beamforming and Information Transfer via Large Intelligent Surface", IEEE Wireless Communications Letters, Apr. 2020, vol. 9, No. 4, pp. 533-537.

Zhao, Hanting, et al., "Metasurface-Assisted Passive Wireless Communication with Commodity Wi-Fi Signals", Jan. 27, 2020, Available Online: arXiv:2001.09567v1, https://arxiv.org/abs/2001.09567v1.

Xiong, Bo, et al., "Controlling the degrees of freedom in metasurface designs for multi-functional optical devices", Nanoscale Advances, Sep. 2019, vol. 1, pp. 3786-3806.

Tang, Wankai, et al., "Programmable metasurface-based RF chain-free 8PSK wireless transmitter", Electronics etters, Apr. 4, 2019, vol. 55, No. 7, pp. 417-420.

NTT Docomo, Inc., Study on New Radio Access Technology, 3GPP TSG RAN meeting #75, RP-170376, Dubrovnik, Croatia, Mar. 6-9, 2017, 157 pages.

* cited by examiner

MEDIA-BASED RECONFIGURABLE INTELLIGENT SURFACE-ASSISTED MODULATION

TECHNICAL FIELD

The present disclosure relates generally to wireless communications, and in particular embodiments, use of configurable surfaces for including additional modulation on a redirected beam.

BACKGROUND

In some wireless communication systems, user equipments (UEs) wirelessly communicate with a base station to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication. A wired or wireless communication from a first base station to a second base station is referred to as a backhaul communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

Media-based modulation (MBM) can be used to carry information in variations of a transmission media, i.e. the channel, in contrast to traditional wireless systems where information is embedded in amplitude, phase or frequency of a signal prior to being sent to an antenna. In more sophisticated systems, data can be transmitted through both conventionally modulated signal and channel variations. MBM can be realized by changing one or more radio frequency (RF) properties between the transmitter and receiver; e.g., permittivity, permeability and resistivity, of the propagation environment.

A common way to do so is by using tunable parasitic elements/objects external to the antenna. An RF mirror with an ON/OFF switch, that can allow/prevent the incident wave to pass through it transparently, can be used for this purpose. The RF mirrors are activated according to the mirror activation pattern to convey information and the receiver should be trained for those patterns before communication starts.

SUMMARY

Aspects of the application provide for a reconfigurable intelligent surface (RIS) to be used in a wireless communication network to overlay information on signals, which may or may not contain information, using configurable elements that make up the surface of the RIS, while beamforming the signal. Additional aspects of the application provide signalling for configuration information that enable the overlay of information by the RIS.

Embodiments described herein use phase shifting ability of the RIS configurable elements to provide many degrees of freedom that enable data overlaying on transmitted signals. The data overlaying is done while the RIS is also beamforming the signal towards one or more receiver. The phase shifting capabilities of the RIS elements can provide amplitude, phase, frequency, and polarization manipulations.

Some aspects of the disclosure provide a method including receiving, by a RIS, first configuration information for enabling the RIS to redirect a signal by beamforming. A further step involves receiving, by the RIS, second configuration information for enabling the RIS to modulate the received signal to overlay additional information on the signal. Another step involves receiving, by the RIS, the signal to be redirected to a receiver. Yet another step involves simultaneously beamforming the received signal to redirect the received signal to the receiver based on the first configuration information and modulating the received signal to overlay additional information on the received signal based on the second modulation information.

Some aspects of the disclosure provide an apparatus including: a reconfigurable intelligent surface (RIS) comprising a plurality of configurable elements capable of redirecting and modulating a signal incident on the plurality of configurable elements, a processor, and a computer-readable medium having stored thereon computer executable instructions. The computer executable instructions, when executed, cause the processor to: receive first configuration information for enabling the RIS to redirect the signal by beamforming; receive second configuration information for enabling the RIS to modulate the received signal to overlay additional information on the signal; receive the signal to be redirected to a receiver; and beamform the received signal to redirect the received signal to the receiver based on the first configuration information and modulate the received signal to overlay additional information on the received signal based on the second modulation information.

In some embodiments, the RIS and a transmitter that generates the signal redirected by the RIS are collocated or part of a same device.

Some aspects of the disclosure provide a method including receiving, by a user equipment (UE), first configuration information notifying the UE of attributes of a RIS used to modulate a signal transmitted by a transmitter in order for the RIS to overlay additional information on the signal. Additional steps involve receiving, by the UE, the signal that is redirected by the RIS and decoding the received signal to recover the signal transmitted by the transmitter and the additional information overlaid on the signal by the RIS.

In some embodiments, the method further involving, receiving, by the UE, a message notifying the UE that the RIS is enabled for use to overlay the additional information.

In some embodiments, the overlay of the additional information occurs in a dynamic or a semi-static or opportunistic manner.

In some embodiments, receiving the signal that is redirected by the RIS originates from: a base station for a downlink transmission; or a UE for a sidelink transmission.

Some aspects of the disclosure provide an apparatus including a processor and a computer-readable medium having stored thereon computer executable instructions. The computer executable instructions, when executed, cause the processor to receive first configuration information notifying the UE of attributes of a RIS used to modulate a signal transmitted by a transmitter in order for the RIS to overlay additional information on the signal, receive the signal that is redirected by the RIS and decode the received signal to recover the signal transmitted by the transmitter and the additional information overlaid on the signal by the RIS.

Some aspects of the disclosure provide a method including transmitting, by a base station, first configuration information for enabling a reconfigurable intelligent surface (RIS) to redirect a signal by beamforming and transmitting, by the base station, second configuration information for enabling the RIS to modulate the signal to overlay additional information on the signal.

In some embodiments, the method further involving, transmitting a message to the RIS enabling the overlay of the additional information by the RIS.

In some embodiments, the second configuration information enables the overlay of the additional information by the RIS to occur in a dynamic or a semi-static or opportunistic manner.

In some embodiments, the base station and the RIS are collocated or part of a same device.

In some embodiments, the base station and the RIS are separate and distinct network elements. In some embodiments, the method further involving, transmitting, by the base station, a message notifying a receiver that receives a signal comprising additional information overlaid on a signal sent by a transmitter that the RIS is enabled for use to overlay the additional information.

In some embodiments, the method involving, by the base station, transmitting a message notifying a receiver that receives a signal comprising additional information overlaid on a signal sent by a transmitter of transmission configuration information pertaining to the RIS and the transmitter.

In some embodiments, the method involving, by the base station, transmitting a message notifying a transmitter of a signal on which additional information is overlaid of transmission configuration information to be used by the transmitter.

In some embodiments, when the base station is a receiver that receives a signal comprising modulated additional information overlaid on a signal sent by a transmitter, the base station transmitting a message notifying a transmitter of transmission configuration information to be used by the transmitter.

In some embodiments, the method involving, receiving a signal that has been beamformed and has information overlaid upon it by the RIS.

In some embodiments, the method further involving, receiving an indication from the RIS of second configuration information that has been determined by the RIS.

Some aspects of the disclosure provide an apparatus including a processor and a computer-readable medium having stored thereon computer executable instructions. The computer executable instructions, when executed, cause the processor to transmit first configuration information for enabling a RIS to redirect a signal by beamforming and transmit second configuration information for enabling the RIS to modulate the signal to overlay additional information on the signal.

In some embodiments, the computer executable instructions. when executed, further cause the processor to transmit a message to the RIS enabling the overlay of the additional information by the RIS.

In some embodiments, the second configuration information enables the overlay of the additional information by the RIS to occur in a dynamic or a semi-static or opportunistic manner.

In some embodiments, the base station and the RIS are collocated or part of a same device.

In some embodiments, the base station and the RIS are separate and distinct network elements.

In some embodiments, the computer executable instructions, when executed, further cause the processor to transmit a message notifying a receiver that receives a signal comprising additional information overlaid on a signal sent by a transmitter that the RIS is enabled for use to overlay the additional information.

In some embodiments, the computer executable instructions, when executed, further cause the processor to transmit a message notifying a receiver that receives a signal comprising additional information overlaid on a signal sent by a transmitter of transmission configuration information pertaining to the RIS and the transmitter.

In some embodiments, the computer executable instructions, when executed, further cause the processor to transmit a message notifying a transmitter of a signal on which additional information is overlaid of transmission configuration information to be used by the transmitter.

In some embodiments, the apparatus is a receiver that receives a signal comprising additional information overlaid on a signal sent by a transmitter, the apparatus transmitting a message notifying a transmitter of transmission configuration information to be used by the transmitter.

In some embodiments, the computer executable instructions, when executed, further cause the processor to receive a signal that has been beamformed and has information overlaid upon it by the RIS.

In some embodiments, the computer executable instructions, when executed, further cause the processor to receive an indication from the RIS of second configuration information that has been determined by the RIS.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
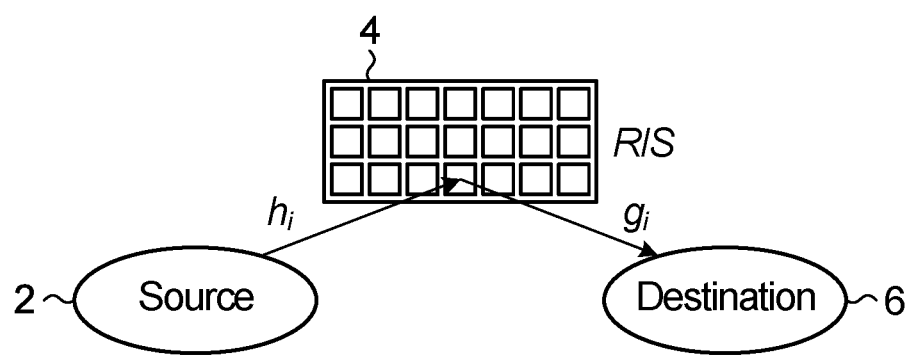
FIG. 1 is a schematic diagram of a transmission channel between a source and destination in which a planner array of configurable elements is used to redirect signals according to an aspect of the disclosure.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

As indicated above, MBM can be realized by changing one or more RF properties between the transmitter and receiver; e.g., permittivity, permeability and resistivity, of the propagation environment. A common way to do so is by using tunable parasitic elements/objects external to the antenna. An RF mirror with an ON/OFF switch, that can allow/prevent the incident wave to pass through it transparently, can be used for this purpose. The RF mirrors are activated according to the mirror activation pattern to convey information and the receiver should be trained for those patterns before communication starts.

The advantages of MBM include being a simple transmission scheme. Only one RF chain is required in its simplest form. Also, constellation size can be increased by increasing the RF mirrors. More importantly, the performance significantly improves when the receiver is equipped with multiple antennas.

A Reconfigurable Intelligent Surface (RIS), also known as large intelligent surface (LIS), smart reflect-array, intelligent passive mirrors, artificial radio space, reconfigurable metasurface, holographic multiple input multiple output (MIMO) is an array of configurable elements. These configurable elements may be also known as metamaterial cells or unit cells. A metamaterial (which may also be referred to as a Beyond-Material) is a material that is engineered to change its properties in order to manipulate amplitude and/or phase of a wave incident on the metamaterial. Manipulation of the amplitude and/or phase can be achieved by changing an impedance or relative permittivity (and/or permeability) of the metamaterial. At low frequencies, the impedance is controlled through lumped elements like PIN diodes, varactors, transistors or microelectromechanical system (MEMS). At higher frequencies, the relative permittivity and/or permeability of the material element (like liquid crystal at high frequencies and graphene at even higher frequencies) changes its permittivity in accordance to changes in a bias voltage provided to the material. Consequently, the phase of the signal redirected by the material is changed in accordance with the change in permittivity. As the bias voltages involved for these materials are quite low, the materials are often referred to as passive phase shifters.

In some discussions in this disclosure, RIS devices may be referred as a set of configurable elements arranged in a linear array or a planar array. Nevertheless, the analysis and discussions are extendable to other two or three dimensional arrangements (e.g., circular array). A linear array is a vector of N configurable elements and a planar array is a matrix of N×M configurable elements, where N and M are integer values. These configurable elements have the ability to redirect a wave/signal that is incident on the linear or planar array by changing the phase of the wave/signal. The configurable elements are also capable of changing the amplitude, polarization, or even the frequency of the wave/signal. In some planar arrays these changes occur as a result of changing bias voltages that controls the individual configurable elements of the array via a control circuit connected to the linear or planar array. The control circuit that enables control of the linear or planar array may be connected to a communications network that base stations and UEs communicating with each other are part of. For example, the network that controls the base station may also provide configuration information to the linear or planar array. Control methods other than bias voltage control include, but are not limited to, mechanical deformation and phase change materials.

Because of their ability to manipulate the incident wave, the low cost of these types of devices, and because these types of devices require small bias voltages, RIS have recently received heightened research interest in the area of wireless communication as a valuable tool for beamforming and/or modulating communication signals. A basic example for RIS utilization in beamforming is shown in FIG. 1 where each RIS configurable element (unit cell) can change the phase of the incident wave from source such that the reflected waves from all of the RIS elements are aligned to the direction of the destination to increase or maximize its received signal strength (e.g. maximize the SNR). Such a reflection via the RIS may be referred to as reflect-array beamforming.

The present disclosure provides methods and devices that use the RIS phase shifting ability to provide many degrees of freedom to enable data to be overlayed on transmitted signals. The data overlay is done while the RIS is still beamforming the signal towards the receiver(s). The phase shifting capabilities of the RIS elements can provide amplitude, phase, frequency, and polarization manipulations. These manipulations can help enhance the communication and provide the ability to overlay information. The present application also provides new configuration signaling among devices in a communication network utilizing the RIS and configuration for the RIS.

FIG. 1 illustrates an example of a planar array of configurable elements, labelled in the figure as RIS 4, in a channel between a source 2, or transmitter, and a destination 6, or receiver. The channel between the source 2 and destination 6 include a channel between the source 2 and RIS 4 identified as $h_i$ and a channel between the RIS 4 and destination 6 identified as $g_i$ for the $i^{th}$ RIS configurable element (RIS unit cell) where $i \in \{1, 2, 3, \ldots, N*M\}$ assuming the RIS consists of N*M elements or unit cells. A wave that leaves the source 2 and arrives at the RIS 4 can be said to be arriving with a particular angle of arrival (AoA). When the wave is reflected or redirected by the RIS 4, the wave can be considered to be leaving the RIS 4 with a particular angle of departure (AoD).

While FIG. 1 having the two dimensional planar array RIS 4 shows a channel $h_i$ and a channel $g_i$ the figure does explicitly show an elevation angle and azimuth angle of the transmission from the source 2 to RIS 4 and the elevation angle and azimuth angle of the redirected transmission from the RIS 4 to the destination 6. In the case of a linear array, there may be only one angle to be concerned about, i.e. the azimuth angle.

Assuming that the RIS 4 has a total of N elements, each reflecting the incident wave with a phase change $\theta_i$, the source 2 sends a modulated symbol x, and n is the receiver noise, then the received signal y, with non-line of sight (NLOS), is:

$$y = \Sigma_{i=1}^N h_i g_i e^{j\theta_i} x + n$$

To maximize a signal-to-noise (SNR), it is intuitive to choose a phase change at each RIS element to cancel the phases due to the overall channels, which results in pure constructive superposition. It is assumed that different $h_i$ have the same magnitude, and the same magnitude for different $g_i$ and α and β denote the channel magnitudes. This is true for far field at high frequency propagation which is mostly dominated by line of sight (LOS) and having few paths. The resulting signal can be simplified to y=Nαβ x+n. The SNR is scaled quadratically with N providing higher capacity. As will be described below, the RIS can adaptively enhance the transmission, transmit alone, or even transmit at the same time as the transmitter is sending data. Great flexibility can be afforded by using RIS-assisted communications that can make use in future systems.

To examine the proposed solution, the received signal of the system can be rewritten given the above in the form:

$$y = \Sigma_{i=1}^N h_i g_i e^{j\theta_i} x + n$$

Instead of having the RIS cancel the combined channel phase, the RIS elements are also capable of introducing an extra phase shift $e^{j\psi}$. Since all the elements introduce the same extra phase shift, the signals from different RIS elements still superpose constructively. Also, the RIS can be configured to select the number of elements to be turned on during each transmission. When that happens, instead of having just a constant amplitude N, the result is $x_2$, which can take any integer value not exceeding N. The received signal can then be expressed in the form:

$$y = \alpha\beta A\, x e^{j\psi} + n$$

Non-integer values of A are possible if some RIS elements reflect with non-constructive phase shift values. As a result, the RIS can be used to generate a general quadrature amplitude modulation (QAM) constellation. In such a case, the RIS can implement amplitude modulation by varying the value A, for example turning one or more configurable elements of the RIS "on" or "off" to modulate the amplitude, or implement phase modulation by varying the phase value in $e^{j\psi}$, or both. The effect of the RIS in the system is multiplicative as shown in the above equation. This form allows for many use cases opening the full potential for RIS. The overlaid modulation signal then can be expressed as $x_2 = Ae^{j\psi}$.

Because the RIS can change its phase, the RIS can induce a linear phase shift with respect to time. Since frequency is obtained as a phase derivative, a linear phase shift will change the frequency of a signal reflected or redirected by the elements of the RIS. More control can be provided by carefully adjusting the phase shift for each element, which can also result in changing the polarization of the beam impinging on the RIS.

Based on the discussions above, using phase manipulation of the RIS, it is possible to manipulate the phase, amplitude, frequency, or polarization of a signal reflected or redirected by the RIS such that information can be transmitted by modulating the signal being reflected or redirected. By doing so, the RIS can send or overlay data using its passive elements while still beamforming as conventionally known.

In general, the RIS response time can be different from the underlying signal. For example, the data stream being overlaid on the reflected signal by the RIS can be slower than that from the transmitter. The reason for that stems from the technology of the RIS that has different response rates, and the rate of the underlying transmitted wave.

In embodiments related to signalling used to implement aspects described herein, the signalling enables the RIS to overlay data on the transmitter signal. In addition to the signalling presented herein, conventional signalling that enable RIS beamforming may also be used. Processes involving beamforming include end to end channel estimation from the transmitter to the receiver, or individual channels from transmitter to the RIS and from RIS to the receiver. Also, RIS beamforming includes applying appropriate phase manipulation at the RIS, at the transmitter arrays and/or the receiver arrays to ensure proper transmit beamforming towards the RIS at the transmitter, proper beam reflection at the RIS and/or proper receiving beamforming at the receiver.

There are different transmission strategies used to transmit data, for example grant based or configured grant. Various embodiments enable the RIS to overlay data using those various strategies. For example, RIS transmission can be grant based where the network dynamically schedules the RIS transmission. RIS transmission can also be semi-static, where the network pre-assigns a channel for RIS to transmit data; e.g. with a periodic pattern. In this case, a network may use signalling to enable or disable, or both, the RIS. The network can enable/disable the RIS performing data overlay by using a media access control—control element (MAC-CE). If the RIS is overlaying information without the UE being informed that the RIS may be overlaying information on a beam from another device then the receiver should perform RIS activity detection to determine if the RIS is overlaying information on a beam from another device. This is in addition to opportunistic transmission, where the RIS overlays data over existing transmissions when there is data for the RIS to transmit. For example, when the RIS has data to send to a first UE, UE A, the RIS waits for the network to schedule UE A through beamforming of the RIS, and the RIS overlays its own data on the beam impinging the RIS.

In another example, at a time of beam sweeping by the transmitter, the RIS overlays data to different beams to broadcast some information. An example of the information being broadcast may include the RIS announcing its existence. Embodiments of the application also include signalling processes that enable these different transmission strategies.

The RIS receives control signals describing the transmission attributes. Examples of RIS transmission attributes include, but are not limited to, time/frequency resources, frame structure (including information about the waveform, synchronization signals, pilot/data resources), symbol (chip) rate, modulation coding scheme (MCS), transmission scheme (e.g., orthogonal frequency divisional multiplexing (OFDM) vs Single carrier, frequency modulation (FM) vs quadrature amplitude modulation (QAM), . . . ) and scheduling decisions. In a case when the RIS is fully network controlled, decisions for selecting the transmission attributes for the RIS are made by the network. In other implementations, the RIS partially controls the selection of the transmission attributes. An initial step of the signalling embodiments may involve radio resource control (RRC) signalling on configuration information relevant to data overlay performed by the RIS. That may include setting some parameters that are RIS specific such as RIS identifier (ID), symbol rate and modulation mechanism (quadrature amplitude modulation (QAM), phase modulation (PM), frequency modulation (FM), or polarization modulation).

Figure 2:
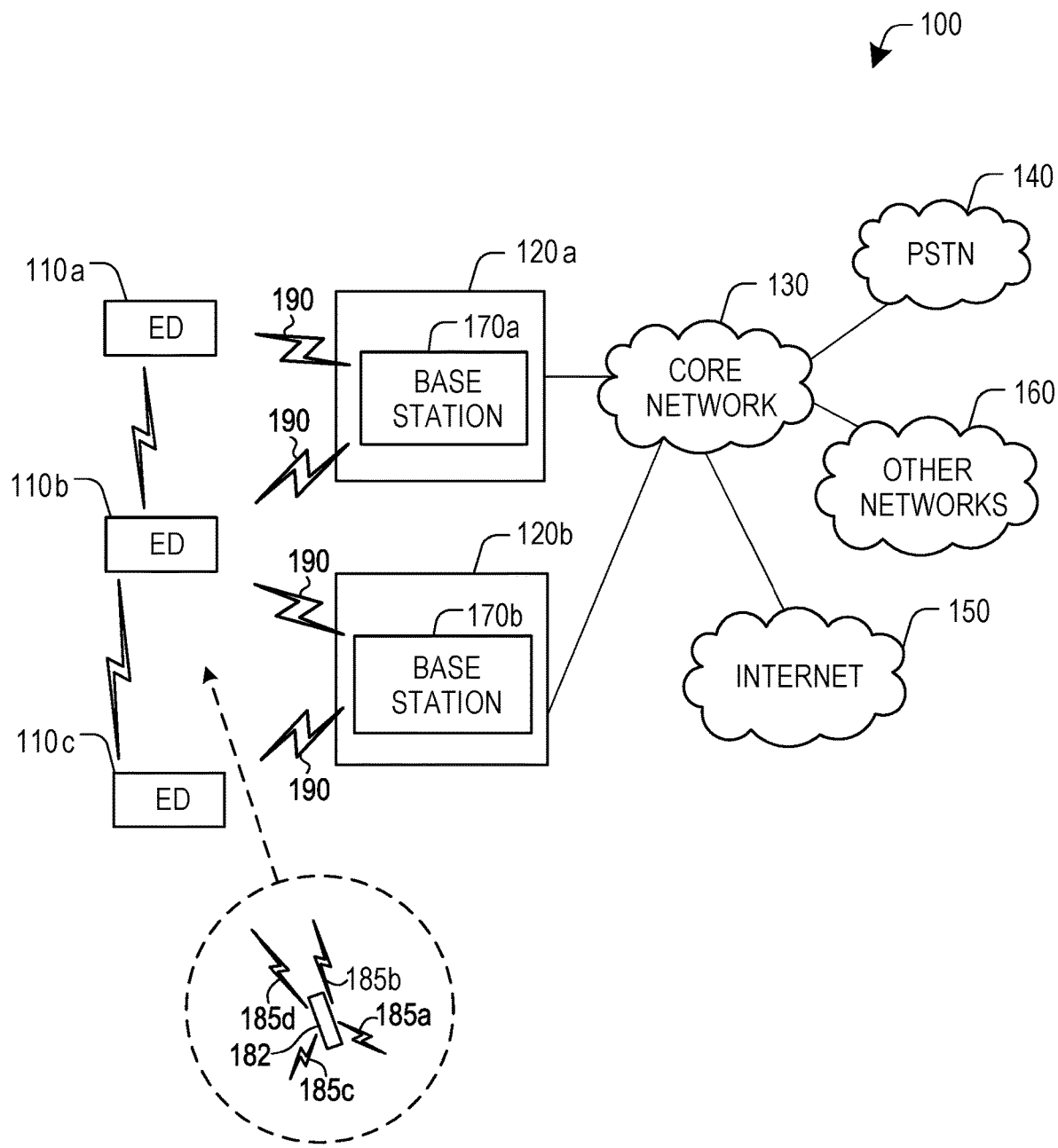
FIG. 2 is a schematic diagram of a communication system in which embodiments of the disclosure may occur.
Figure 3A:
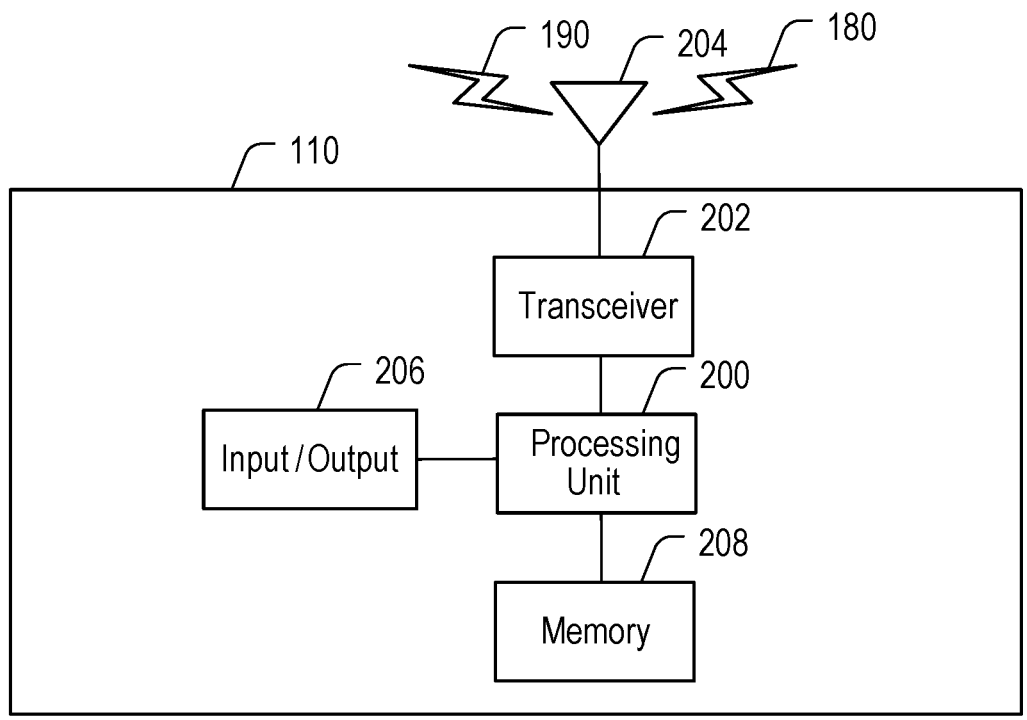
FIGS. 3A, 3B and 3C are block diagrams of an example user equipment, base station and RIS, respectively.
Figure 3B:
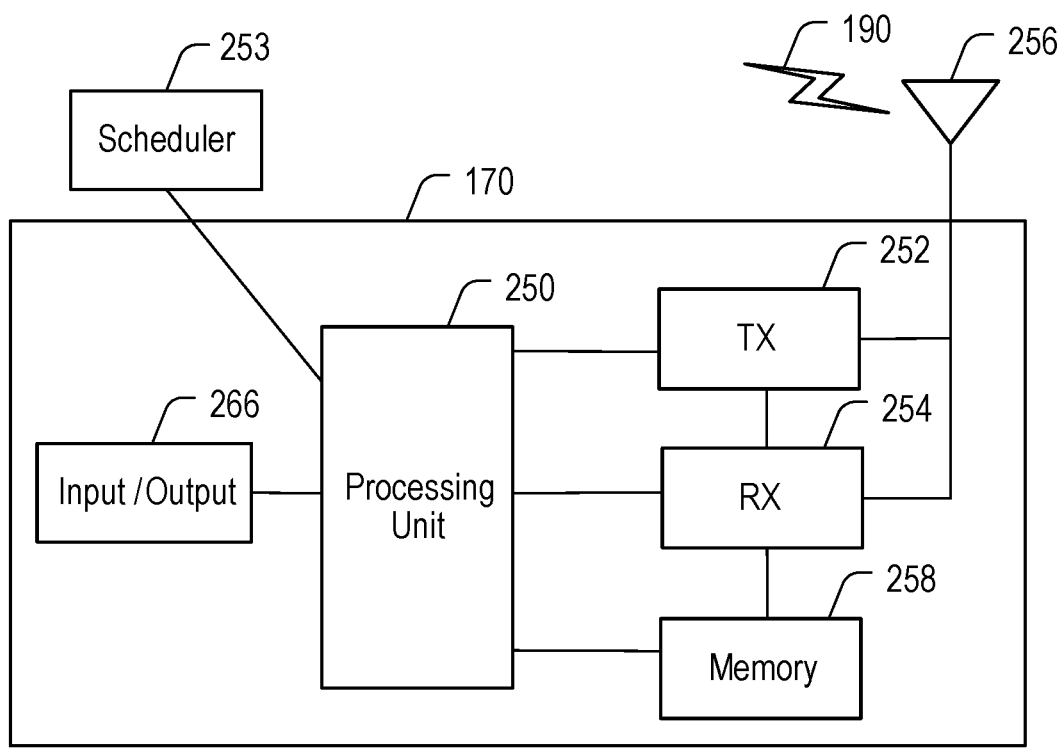

FIGS. 2, 3A, and 3B following below provide context for the network and device that may be in the network and that may implement aspects of the present disclosure.

FIG. 2 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 2, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, consumer electronics device, Internet of Things (IoT) device, wearable device, or vehicular device (or vehicle-mounted device, vehicle on-board equipment).

FIG. 2 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 2, any reasonable number of these components or elements may be included in the communication system 100.

The EDs 110a-110c are configured to operate, communicate, or both, in the communication system 100. For example, the EDs 110a-110c are configured to transmit, receive, or both, via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 2, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding.

The EDs 110a-110c and base stations 170a-170b are examples of communication equipment that can be configured to implement some or all of the functionality and/or embodiments described herein. In the embodiment shown in FIG. 2, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Uplink Packet Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160).

The EDs 110a-110c communicate with one another over one or more SL air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110a-110c communication with one or more of the base stations 170a-170c, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support multiple radio access technologies.

Also shown in FIG. 2 is an example of where an RIS 182, that is a separate node from a transmitter, may be located within a serving area of base station 170b. A first signal 185a is representative of a signal from the base station 170b to the RIS 182 and a second signal 185b is representative of a signal from the RIS 182 to the ED 110b, illustrating how the RIS 182 might be located within the uplink or downlink channel between the base station 170b and the ED 110b. Also shown is a third signal 185c representative of a signal from the ED 110c to the RIS 182 and a fourth signal 185d is representative of a signal from the RIS 182 to the ED 110b, illustrating how the RIS 182 might be located within the SL channel between the ED 110c and the ED 110b.

While only one RIS 182 is shown in FIG. 2, it is to be understood that any number of RIS could be included in a network.

It other embodiments, as described in further detail below, the RIS may be integrated, or collocated with, the transmitter.

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail herein. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

In some embodiments, a RIS may be part of the base station 170, for example as part of antenna 256.

Figure 3C:
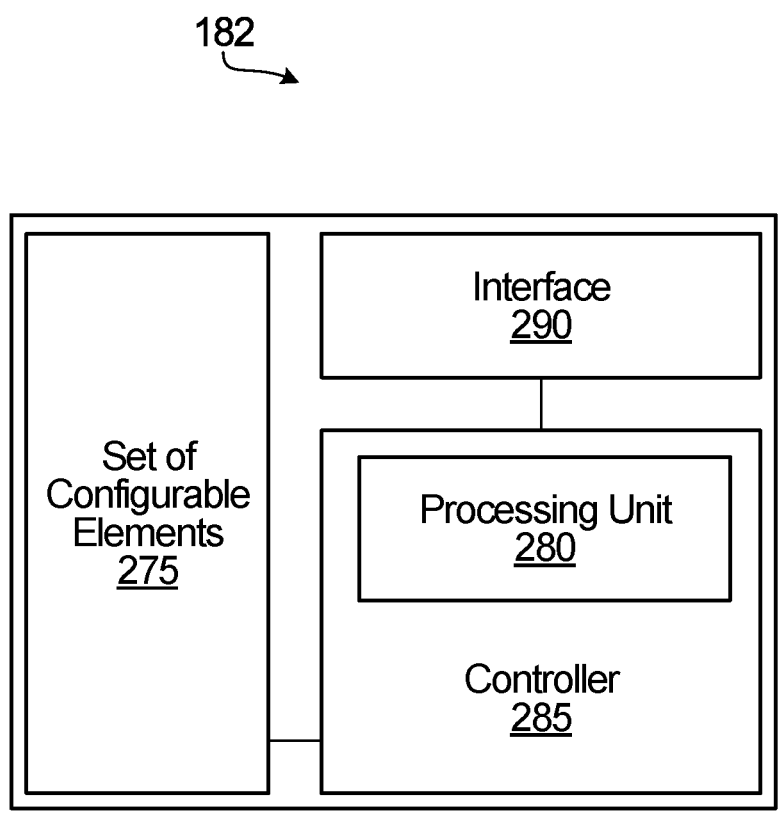

FIG. 3C illustrates an example of a RIS device that may be a separate node from the transmitter, as described in some aspects of this disclosure. In particular, FIG. 3C illustrates an example RIS 182. These components could be used in the system 100 or in any other suitable system.

As shown in FIG. 3C, the RIS 182 includes a controller 285 that includes at least one processing unit 280, an interface 290, and a set of configurable elements 275.

The processing unit 280 implements various processing operations of the RIS 182, such as receiving the configuration signal via interface 290 and providing the signal to the controller 285. The processing unit 280 could, for example, include a microprocessor, microcontroller, digital signal processor, field programmable gate array, or application specific integrated circuit.

The interface 290 enables control information for controlling the RIS or used by the RIS in the process of overlaying additional information to be received from the network, possibly via a base station in the area being served by the base station. In some embodiments the control information may be received by receive elements of the set of configurable elements and messaging can be done over the air.

While this is a particular example of an RIS, it should be understood that the RIS may take different forms and be implemented in different manner than shown in FIG. 3C. The RIS 182 ultimately needs a set of configurable elements that can be configured as described to operate herein.

While FIG. 3C shows an interface to receive configuration information from the network, if in embodiments when an antenna or a sensor were to be connected to the RIS, it may be considered a separate element from the RIS.

Additional details regarding the UEs 110 and the base stations 170 are known to those of skill in the art. As such, these details are omitted here for clarity.

Various embodiments will now be described in which a RIS is used to modulate a signal sent by a transmitter, for example by overlaying data on the signal sent by the transmitter. Some of the embodiments include implementations in which the RIS is integrated, or collocated with, a transmitter, the RIS is a separate node from the transmitter, the modulation of the data by the RIS is controlled by the network, the modulation of the data by the RIS is partially controlled by the RIS, the RIS is capable of receiving configuration over-the-air (OTA), the RIS is capable of receiving configuration via auxiliary channel, and the scheduling of the signal to the UE, that the RIS may overlay further data, is dynamic, opportunistic or semi-static.

In some embodiments, the RIS is a part of a transmitter, or is in a vicinity of the transmitter. Accordingly, data that is to be transmitted by the RIS by overlaying the data on a signal being redirected or reflected by the RIS can be obtained from the transmitter. In some embodiments, due to this substantially direct connection to the transmitter no control signalling is needed between the transmitter and the RIS. The RIS may be located such that the transmitter sends a beam towards the RIS, then the RIS beamforms the beam to the receiver. Or the RIS may be located to beamform part of the beam such that the receiver receives a signal from the transmitter directly and another that has been redirect by the RIS. The RIS may overlay data on a beam from the transmitter to one or more receivers. The data modulation rate of overlaying data by the RIS may be different from that of the transmitter, for example the RIS and the transmitter may have different symbol rates. Several variations of arrangements of the integrated transmitter and RIS are described below. Some of these variations can be implemented simultaneously.

Some embodiments provide an arrangement that includes an integrated RIS at the transmitter and involves data overlay. In this embodiment, the RIS is not only performing conventional beamforming of the signal to the receiver, but is also manipulating, or modulating, a signal from the transmitter to encode data on the signal from the transmitter. The RIS can use phase shifting ability to manipulate the phase, or the amplitude, or both, of the transmitted signal. The configurable elements of the RIS can be divided into groups, each group of configurable elements is performing both conventional beamforming and overlaying of additional data to a specific receiver. In this case, the transmitter beamforms the signal to the RIS and the RIS directs the signal to one or more receivers. There may be LOS between the transmitter and one or more of the receivers.

This embodiment of data overlaying provides the ability to send higher order QAM with low peak-to-average power ratio (PAPR). No transmission power is consumed in this communication, regardless of the constellation size. This is done by controlling the configurable elements of the RIS. The communication scheme is flexible in the sense that when the minimum distance is small in a way that can deteriorate the resulting BER, we can choose a sparser constellation; allows adaptive modulation.

Some embodiments provide an arrangement that includes an integrated RIS at the transmitter and involves frequency shifting. In this embodiment, the configurable elements of the RIS induce a linear phase shift to change the frequency of transmission. The RIS is located with respect to the transmitter and receiver such that at least a part of that signal is reflected by configurable elements of the RIS. The RIS changes the frequency of the signal from the transmitter so that the receiver receives two versions of the signal, one directly from the transmitter and the other redirected by the RIS, each having a different center frequency. Another possible scenario involves dividing the configurable elements of the RIS into groups, where each group causes a different frequency shift. This allows the receiver to receive multiple versions of the transmitted signal, each at a respective frequency. In these embodiments, the transmitter beamforms the signal and the RIS directs at least part of the signal to one or more receivers.

One advantage of shifting the frequency in the manner described above is that a wide bandwidth (BW) transmission can be obtained using narrow BW amplifiers. If the receiver receives two versions of the signal or more, this provides increased data rate and/or data capacity.

Some embodiments provide an arrangement that includes an integrated RIS at the transmitter and involves frequency variation. In this embodiment, when the transmitter focuses all, or a majority, of the energy to the RIS, the RIS induces a detectable frequency change in the signal from the transmitter and reflects the signal to the users. This frequency change can be used to transfer information. While it is possible in the case of point-to-point communication that an oscillator can be tuned for the frequency change, in a multiuser system, groups of RIS configurable elements can cause different changes to convey different control information to the receivers. In general, there can be many possible values of frequency variation, and each one corresponds to different information.

According to the frequency shift, the receiver can obtain control information, such as, but not limited to, control signalling, modulation type used, and coding scheme.

Some embodiments provide an arrangement that includes an integrated RIS at the transmitter and involves polarization modulation. By carefully adjusting the phase shift for each x/y coordinate that corresponds to a configurable element of the RIS, the RIS can change polarization of the signal from the transmitter. In some embodiments, if the receiver has antennas with different polarization, the receiver would be able to receive the original signal from the transmitter and the polarization shifted version redirected by the RIS. It is also possible that the receiver may only receive the signal from the RIS only, depending on whether there is LOS between the transmitter or not.

The reception of two versions of the signal, i.e. one version on each polarization, provides better rate/capacity. There are also technical benefits from polarization changing when the receiver only receives from the RIS. For example, depending on which polarization is sent, certain information is understood. Basically, two polarizations allow for a 1 bit data transfer. For example, this may allow for when a first polarization is received corresponding to a "0" bit and when a second polarization is received corresponding to a "1" bit. In addition, the RIS may change polarization if the channel for one polarization is better for data transmission than the other.

In addition to the signalling to enable conventional RIS beamforming, additional control signals related to the RIS functionality should be sent to the receiver. Those signals can be identifiers for possible modulation schemes that could be used when the RIS is overlaying data, information regarding the frequency shift for proper reception, or providing polarization information. Example signalling flow diagrams will be described in detail below.

In some embodiments, the RIS is a separate node spaced apart from the transmitter and both the transmitter and RIS cooperate to send data to the receiver. Any combination of constellations can be used for data overlay as long as the receiver is able to correctly demodulate the received signal. The receiver should further be able to determine which symbol is sent by the transmitter and which is sent by the RIS. The RIS may contain some receive elements that enable data reception at those elements. It may be connected to the network wired or wirelessly. The signal that the RIS modulates to include overlay data can be an UL, DL, SL or backhaul signal. In some embodiments, the RIS is capable of determining one or more transmission attributes, such as, but not limited to MCS. Several variations of arrangements of the transmitter and RIS as a separate node are described below. Some of these variations can be implemented simultaneously.

Some embodiments provide an arrangement that includes the RIS being a separate node from the transmitter and involves data overlay. In a particular example, not intended to limited other implementations, the transmitter is sending a modulated phase shift keying (PSK) signal, and the RIS overlays data by changing the amplitude of the signal by turning on and off configurable elements of the RIS providing a reasonable minimum distance; multi-level amplitude shift keying (ASK) signal. The opposite scenario is also possible in which the transmitter is sending an ASK signal, and the RIS overlays data by changing the phase of the signal by modulating the configurable elements of the RIS to provide a PSK signal. The transmitter may be even sending a known signal, such as a reference signal, to the user. In some embodiments, for different data streams, the receiver is able to decode data using the magnitude and phase, as in conventional QAM modulation, and is further able to determine which data is sent by the transmitter and which is sent by the RIS. In some embodiments, the RIS is capable of beamforming and data overlaying for multiple receivers.

This embodiment of data overlaying provides the ability to send higher order QAM. No transmission power is consumed in this communication, regardless of the constellation size. This is done by controlling the configurable elements of the RIS. The communication scheme is flexible in the sense that when the minimum distance is small in a way that can deteriorate the resulting BER, we can choose a sparser constellation; allows adaptive modulation.

Some embodiments provide an arrangement that includes the RIS being a separate node from the transmitter and involves frequency shifting. In this embodiment, the RIS induces a linear phase shift to change the frequency. One advantage of doing this obtaining a wide BW transmission using narrow BW amplifiers. The RIS is located with respect to the transmitter and receiver such that at least a part of that signal is reflected by configurable elements of the RIS. The RIS changes the frequency so that the receiver receives two versions of the signal at different frequencies resulting in an increased data rate. Another possible scenario involves dividing the RIS into groups of configurable elements, where each group causes a different frequency shift. This allows receiving at the receiver of multiple versions of the transmitted signal, each at a respective frequency. In these embodiments, the transmitter beamforms the signal and the RIS directs at least part of the signal to one or more receivers.

If the receiver receives two versions of the signal or more, this provides increased data rate and/or data capacity.

Some embodiments provide an arrangement that includes the RIS being a separate node from the transmitter and involves frequency variation. In this embodiment, when the transmitter focuses all, or a majority, of the energy to the RIS, the RIS induces a detectable frequency change in the signal from the transmitter and reflects the signal to the users. This frequency change can be used to transfer information from the RIS to the receiver. While it is possible in the case of point-to-point communication that an oscillator can be tuned for the frequency change, in a multiuser system, groups of RIS configurable elements can cause different changes to convey different control information to the receivers. In general, there can be many possible values of frequency variation, and each one corresponds to different information.

According to data overlaid in the frequency shift, the receiver can obtain control information, such as, but not limited to, control signalling, modulation type used, and coding scheme.

Some embodiments provide an arrangement that includes the RIS being a separate node from the transmitter and involves polarization modulation. By carefully adjusting the phase shift for each x/y coordinate that correspond to the configurable elements of the RIS, the RIS can change polarization of the signal from the transmitter. If the receiver has antennas with different polarization, it would be able to receive the original signal from the transmitter and the polarization shifted version redirected by the RIS. It is also possible that the receiver may only receive the signal from the RIS only, depending on whether there is LOS between the transmitter or not.

The reception of two versions of the signal, i.e. one version on each polarization, provides better rate/capacity. There are also technical benefits from polarization changing when the receiver only receives from the RIS. For example, depending on which polarization is sent, certain information is understood. Basically, two polarizations allow for a 1 bit data transfer. In addition, the RIS may change polarization if the channel for one polarization is better for data transmission than the other.

For embodiments when the RIS is a separate node from the transmitter and the RIS does not receive control information directly from the transmitter, the RIS is connected to the network by an auxiliary channel; e.g., through wire or wireless channel. In some embodiments, the auxiliary channel connection to the network is via the base station that is transmitting the signal that the RIS is overlaying data. In some embodiments, the transmission attributes to be used by the RIS are controlled by the network. Examples of signalling details for different transmission strategies and scenarios as provided below.

In some embodiments pertaining to downlink, the RIS overlay of data on top of data sent by a transmitter is performed dynamically and controlled by the network. In each scheduling slot, the base station determines which UEs are to be served, the scheduling resources for each UE to be served and attributes of a packet, including, but not limited to, the MCS, to be transmitted from the base station to each UE and from the RIS to the UE. Such attribute information, including information about beamforming, is shared dynamically by the base station with the UEs and with the RIS.

Figure 4A:
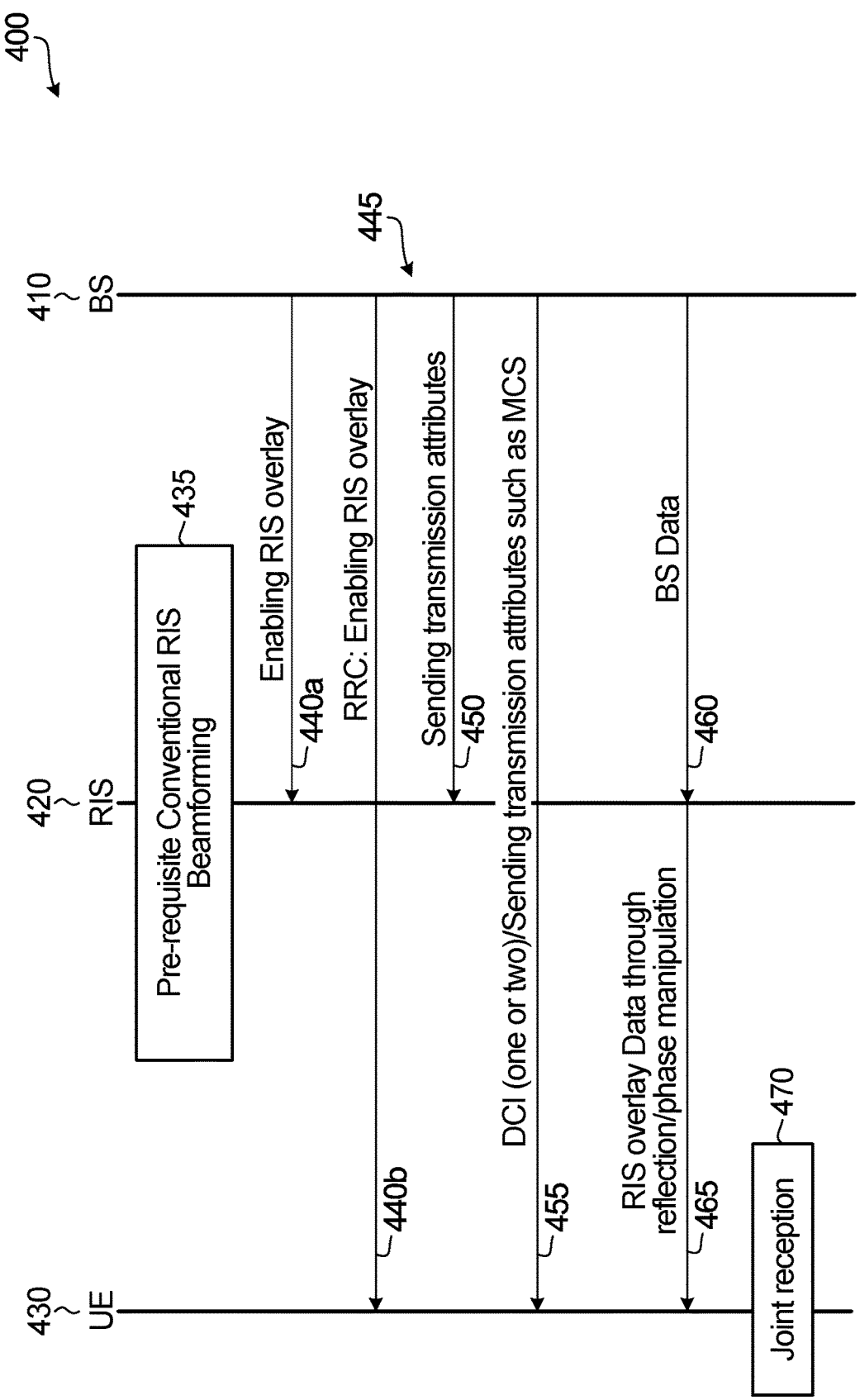
FIG. 4A is a signal flow diagram illustrating signaling between a base station, RIS and UE for configuring and data transmission for dynamic downlink according to an aspect of the application.

FIG. 4A illustrates a signal flow diagram that details signalling between a base station 410, a single UE 430 and a RIS 420 to enable network controlled dynamic downlink RIS overlay. While only a single UE is included in the signal flow diagram, it is to be understood that multiple UEs and more than one RIS could be used in a cell. While the network is being described as controlling dynamic downlink RIS overlay, in some embodiments, the actions of the network are performed by the serving base station or possibly performed elsewhere in the network and provided to the RIS via the serving base station.

Measurements for channel estimation and beamforming configuration processes 435 are illustrated to already have been performed. The network enables the use of the RIS 420 to overlay additional data on a signal transmitted by the base station 410 and redirected by the RIS 420 by RRC signalling 440b to the UE 430 and signalling 440a to the RIS 420 via an auxiliary channel between the base station 410 and the RIS 420. The network performs 445 scheduling and determines transmission attributes for DL and a link between the RIS 420 and the UE 430. The network transmits 450 configuration information to the RIS 420 with beamforming and overlay transmission attributes via the auxiliary channel. The network sends 455 at least one downlink control information (DCI) message to the UE 430 including the attributes of the both the original signal being transmitted by the base station 410 and a signal that is being overlaid on the original signal by the RIS 420. In some embodiments, the network may send two separate DCI messages, one DCI message having the attribute information for the original signal being transmitted by the base station 410 and one DCI message having the attribute information for the signal that is being overlaid on the original signal by the RIS 420. The network sends 460 data with the assigned DL attributes beamformed to the RIS 420. The RIS 420 reflects 460 the signal sent by the base station 410 while overlaying its own data using the assigned attributes. The UE 430 decodes 470 the data from both base station 410 and RIS 420.

The steps 440a and 450 between the base station 410 and the RIS 420 represent communications between these devices. In these cases, the RIS communicates via a wired or wireless connection to the network through an auxiliary channel that can be used for control signalling. The control signals 440*b* and 455 from the base station 410 to UE 430 can be sent using direct link or those signals may be sent from the base station 410 to the RIS 420, then the RIS 420 reflects and beamforms the signal to the UE 430. The RRC signal 440*b* and/or the DCI 455 may use different frequency bands or carriers than the data. The signal 465 represent the signal that is reflected at the RIS 420, where the RIS 420 beamforms and manipulates the signal to overlay its information. The UE 430 jointly receives both data streams and demodulates them. The RRC signal 440*b* sent to the UE 430 enabling the RIS 420 to overlay data may or may not reveal the fact that the overlay is done by a particular RIS. The overlaying can be tied to a specific receive beam at the UE 430. The whole process may be proceeded with a signalling between the UE 430 and the base station 410 to determine UE capability of decoding overlaid data and signalling between the base station 410 and the RIS 420 to determine the RIS capability of overlaying.

In some embodiments pertaining to downlink, the RIS overlay of data on top of data sent by a transmitter is performed in an "on demand" or opportunistic manner and the network does not control short term behavior of the RIS. This means the RIS may not overlay data in every scheduled slot, but can do so when the RIS has data to overlay. The scheduling is dynamic, but is used by the RIS in an "on demand" fashion. In each scheduling slot, the base station determines which UEs are to be served, the scheduling resources for each UE, and attributes of a packet transmitted by the base station to the UE, including but not limited to, the MCS. The attribute information, including beamforming configuration information, is shared dynamically by the base station with the UE and with the RIS. The RIS overlays data on top of the data transmitted by the base station, if and when the RIS desires. The main difference between this on demand embodiment and the fully dynamic embodiment described above is that in this on demand embodiment the base station does not control short term behavior of the RIS and the base station initiates the possibility of the RIS being able to overlay data on the base station transmitted signal by initialization of the resource that the RIS could use.

Figure 4B:
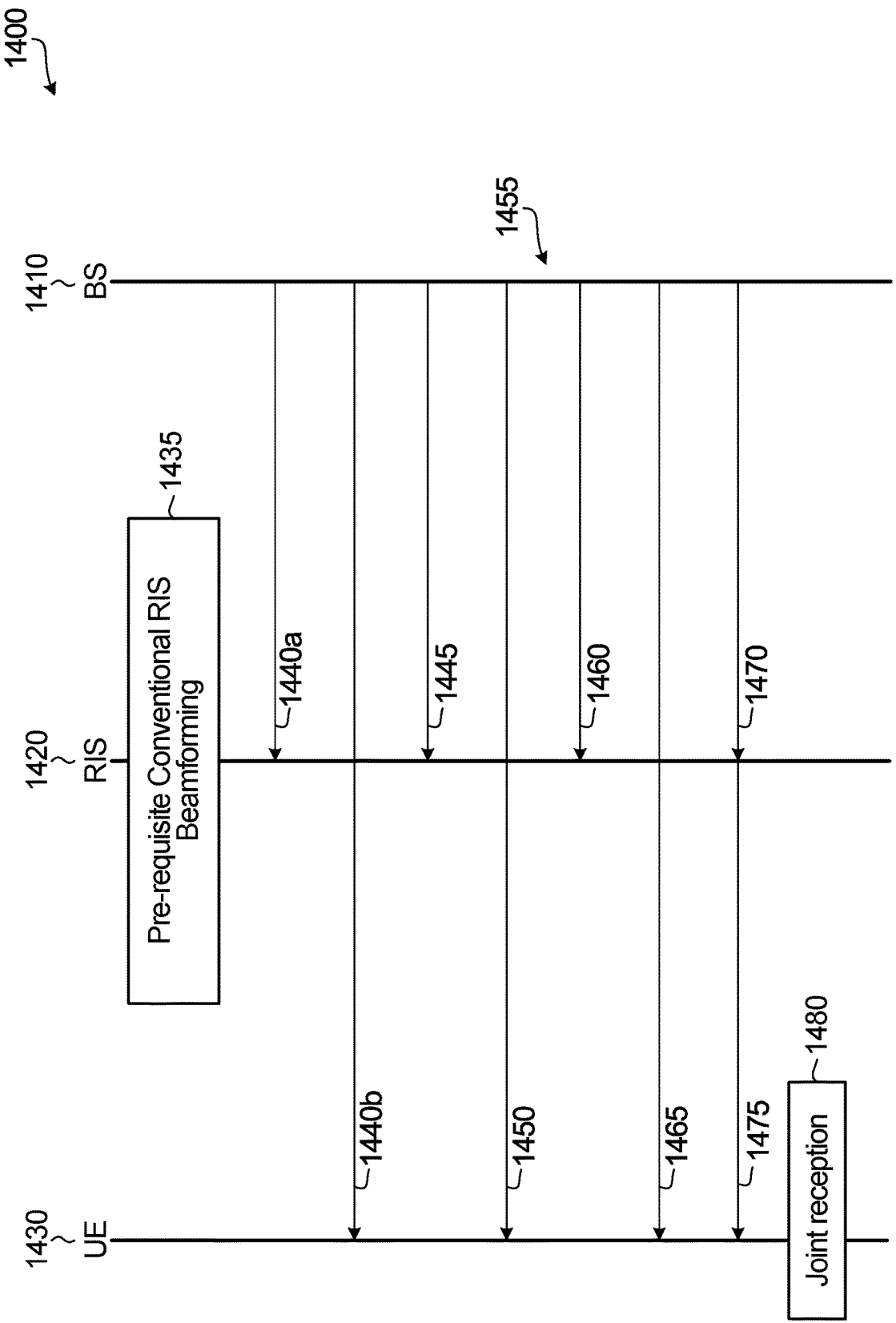
FIG. 4B is a signal flow diagram illustrating signaling between a base station, RIS and UE for configuring and data transmission for opportunistic downlink according to an aspect of the application.

FIG. 4B illustrates a signal flow diagram 1400 that details signalling between a base station 1410, a single UE 1430 and a RIS 1420 to enable network controlled opportunistic downlink RIS overlay. While only a single UE is included in the signal flow diagram, it is to be understood that multiple UEs and more than one RIS could be used in a cell. While the network is being described as controlling opportunistic downlink RIS overlay, in some embodiments, the actions of the network are performed by the serving base station or possibly performed elsewhere in the network and provided to the RIS via the serving base station.

Measurements for channel estimation and beamforming configuration processes 1435 are illustrated to already have been performed. The network enables the use of the RIS 1420 to overlay additional data on a signal transmitted by the base station 1410 and redirected by the RIS 1420 by RRC signalling 1440*b* to the UE 1430 and signalling 1440*a* to the RIS 420 via the auxiliary channel. The network transmits 1445 configuration information to the RIS 1420 with beamforming and overlay transmission attributes via the auxiliary channel. The network informs 1450 the UE 1430 using RRC that the RIS 1420 may overlay data on a signal transmitted by the base station 1410. The network does not need to know whether the RIS 1420 has information to send. For example, it can be an advertisement from a retailer. The network performs 1455 scheduling and determines transmission attributes for DL and a link between the RIS 1420 and the UE 1430. The network sends 1460 configuration information to the RIS 1420 with beamforming attributes through the auxiliary channel. The network sends 1465 at least one DCI message to the UE 1430 including the attributes of the both the original signal being transmitted by the base station 1410 and a signal that is being overlaid on the original signal by the RIS 1420. The transmission attributes of the possible overlay signal can be delivered using one or more of the following: 1) RRC, 2) the same DCI for the DL signal, 3) a new separate DCI). The network sends 1470 data with the assigned DL attributes beamformed to the RIS 1420. The RIS 1420 reflects 1475 the signal sent by the base station 410 while, when desired by the RIS 1420, overlaying data using the assigned attributes. The UE 1430 decodes 1480 the data from both base station 1410 and RIS 1420.

In some embodiments pertaining to downlink, the RIS overlay of data on top of data sent by a transmitter is performed semi-statically. The scheduling of RIS overlay is semi-static and the base station informs the UE of relevant configuration information via RRC and the RIS of relevant configuration information via an auxiliary channel. The relevant configuration information via the RRC may include periodic resources assigned to the UE and attributes of the packet from the base station to the UE. The relevant configuration information via the auxiliary channel from the RIS to the UE may include, for example the MCS. The configuration information, including beamforming configuration information, is shared dynamically by the base station with the UE and with the RIS.

Figure 5:
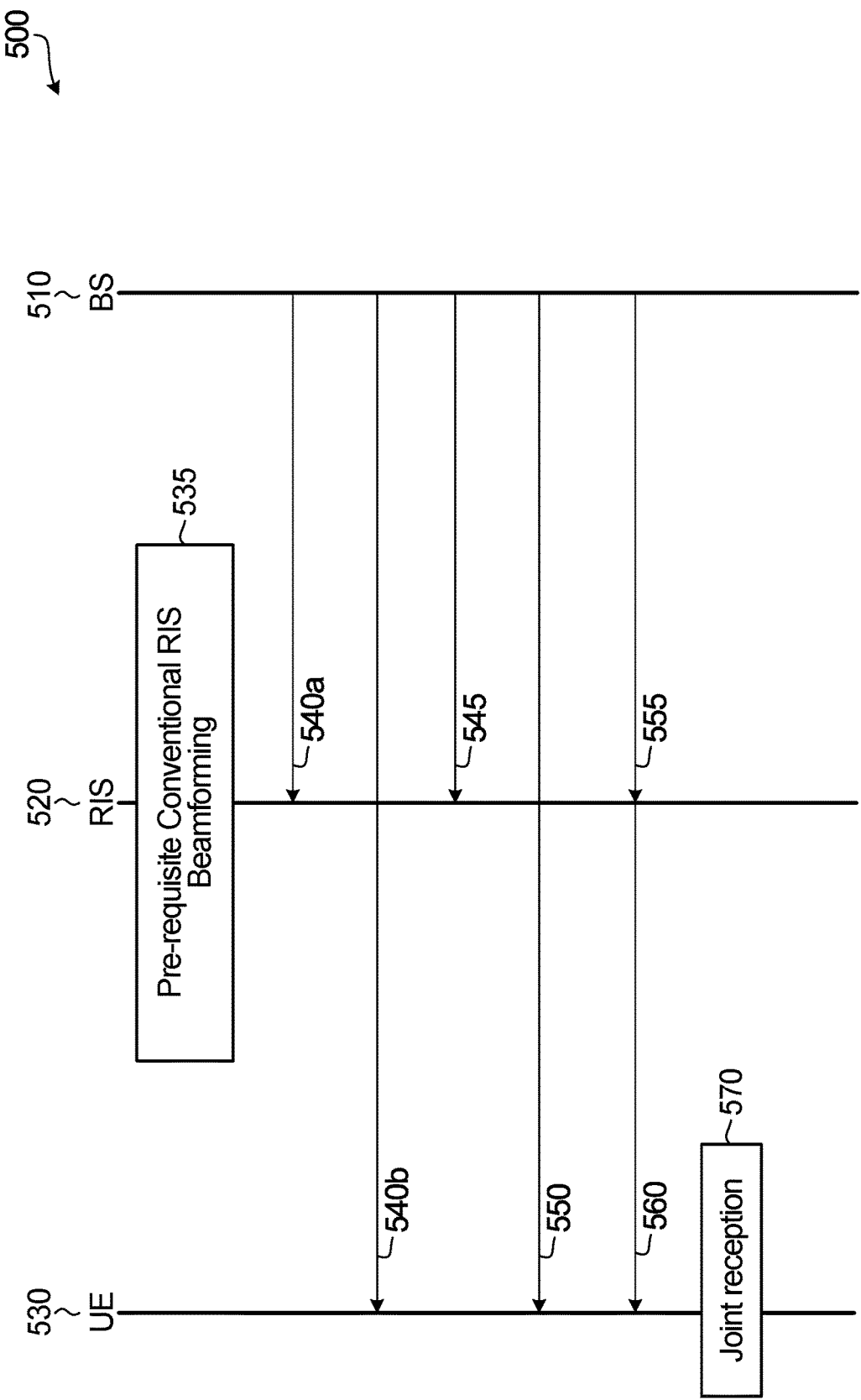
FIG. 5 is a signal flow diagram illustrating signaling between a base station, RIS and UE for configuring and data transmission for semi-static downlink according to an aspect of the application.

FIG. 5 illustrates a signal flow diagram that details signalling between a base station 510, a single UE 530 and a RIS 520 to enable network controlled semi-static downlink RIS overlay. While only a single UE is included in the signal flow diagram, it is to be understood that multiple UEs and more than one RIS could be used in a cell. While the network is being described as controlling semi-static downlink RIS overlay, in some embodiments, the actions of the network are performed by the serving base station or possibly performed elsewhere in the network and provided to the RIS via the serving base station.

Measurements for channel estimation and beamforming configuration processes 535 are illustrated to already have been performed. The network enables the use of the RIS 520 to overlay additional data on a signal transmitted by the base station 510 and redirected by the RIS 520 by RRC signalling 540*b* to the UE 530 and signalling 540*a* to the RIS 520 via the auxiliary channel. The network assigns 545 the RIS transmission attributes and informs 550 the RIS through the auxiliary channel and the UE through RRC signalling. The network sends 555 data with the assigned DL attributes beamformed to the RIS 520. The RIS 520 reflects 560 the signal sent by the base station 510 while overlaying its own data using the assigned attributes. In some embodiments, MAC-CE signalling is used to enable and disable overlay of data using the RIS. In some embodiments, MAC-CE signalling is used to enable and disable both overlay of data using the RIS and DL data, for example when using configured grant. If the RIS activity is on demand, the UE 530 should perform RIS activity detection. An example of when the RIS activity may be considered on demand is when the buffer size of the RIS is unknown to the network. The UE 530 decodes 570 the data from both base station 510 and RIS 520.

In some embodiments pertaining to uplink, the RIS redirects/reflects/beamforms a signal from a UE and overlays data on top of the data transmitted by the UE. The scheduling of transmission resources that may have data overlaid upon them is done dynamically. In each scheduling slot, the base station determines which UEs are to be served, the scheduling resources for each UE, and the attributes of a packet from the UE to the base station and from the RIS to the base station, an example of the attributes including the MCS. The configuration information, including beamforming configuration information, is shared dynamically by the base station with the RIS. In some embodiments, the beamforming configuration information may also be shared by the base station with the UE. The UE does not need to know that the RIS overlay is happening. However, in some embodiments, it may be beneficial for the UE to know which direction the UE should direct its signal and whether the signal sent by the UE should carry any information or just be a pseudo random signal.

Figure 6:
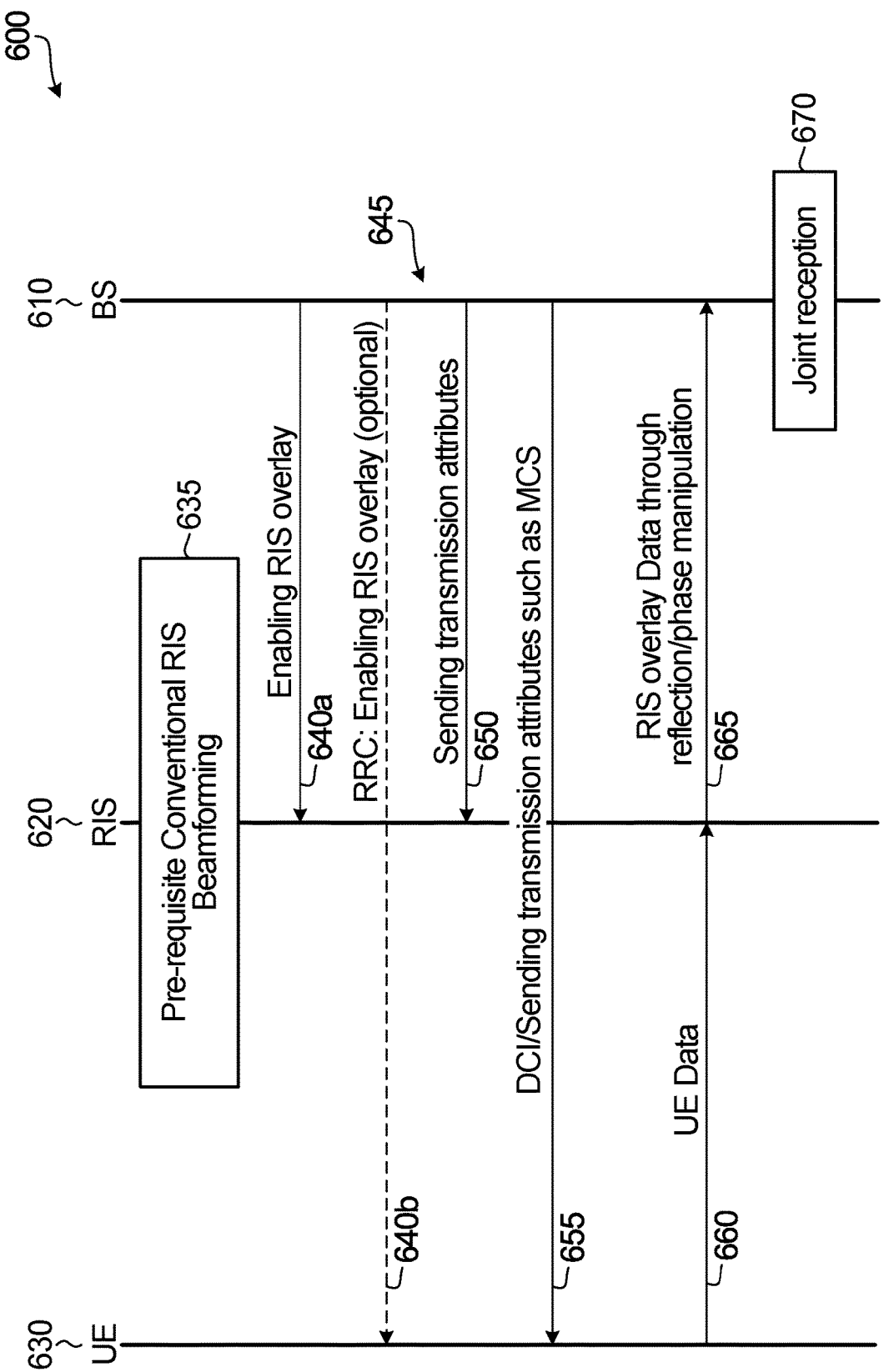
FIG. 6 is a signal flow diagram illustrating signaling between a base station, RIS and UE for configuring and data transmission for dynamic uplink according to an aspect of the application.

FIG. 6 illustrates a signal flow diagram that details signalling between a base station 610, a single UE 630 and a RIS 620 to enable network controlled dynamic uplink RIS overlay. While only a single UE is included in the signal flow diagram, it is to be understood that multiple UEs and more than one RIS could be used in a cell. While the network is being described as controlling dynamic uplink RIS overlay, the actions of the network are performed by the serving base station or possibly performed elsewhere in the network and provided to the RIS via the serving base station.

Measurements for channel estimation and beamforming configuration processes 635 are illustrated to already have been performed. The network enables the use of the RIS 620 to overlay additional data on a signal transmitted by the UE 630 and redirected by the RIS 620 by signalling 640a to the RIS 620 via an auxiliary channel. Optionally, in some embodiments, the network may perform RRC signalling 640b to the UE 630 to aid in enabling the use of the RIS 620 to overlay additional data on a signal transmitted by the UE 630. The network performs 645 scheduling and determines transmission attributes for UL and a link between the RIS 620 and the base station 610. The network transmits 650 configuration information to the RIS 620 with beamforming and overlay transmission attributes via the auxiliary channel. The network sends 655 a DCI message to the UE 630 including the attributes of the signal being transmitted by the UE 630. The UE 630 sends 660 data with the assigned UL attributes beamformed to the RIS 620. The RIS 620 reflects 665 the signal sent by the UE 630 while overlaying its own data using the UL assigned attributes. The base station 610 decodes 670 the data from both the UE 630 and RIS 620.

Embodiments that enable semi-static and opportunistic transmission strategies for UL, similar to those described above for DL, are also considered within the scope of the disclosure.

In some embodiments pertaining to sidelink, the RIS redirects/reflects/beamforms a signal from a first UE (UE A) to a second UE (UE B) and overlays data on top of the data transmitted by the first UE. The base station controls the overlaying of data from UE A, the RIS overlays data on top of the UE A data through redirect/reflection/beamforming by the RIS and UE B receives data. The scheduling of transmission resources that may have data overlaid upon them is done dynamically. In each scheduling slot, the base station determines which UEs are to be served, the scheduling resources for each UE, and the attributes of the packet from the UE A to the UE B and from the RIS to the UE B, including the MCS. The configuration information, including the beamforming configuration information, is shared dynamically by the base station with the UE B and the RIS. In this case, the UE A does not need to know if the overlay by the RIS is happening. For sidelink, this may be preceded by some exchange between the base station and the UE B as well as between the RIS and the base station for the overlaying capabilities.

Figure 7:
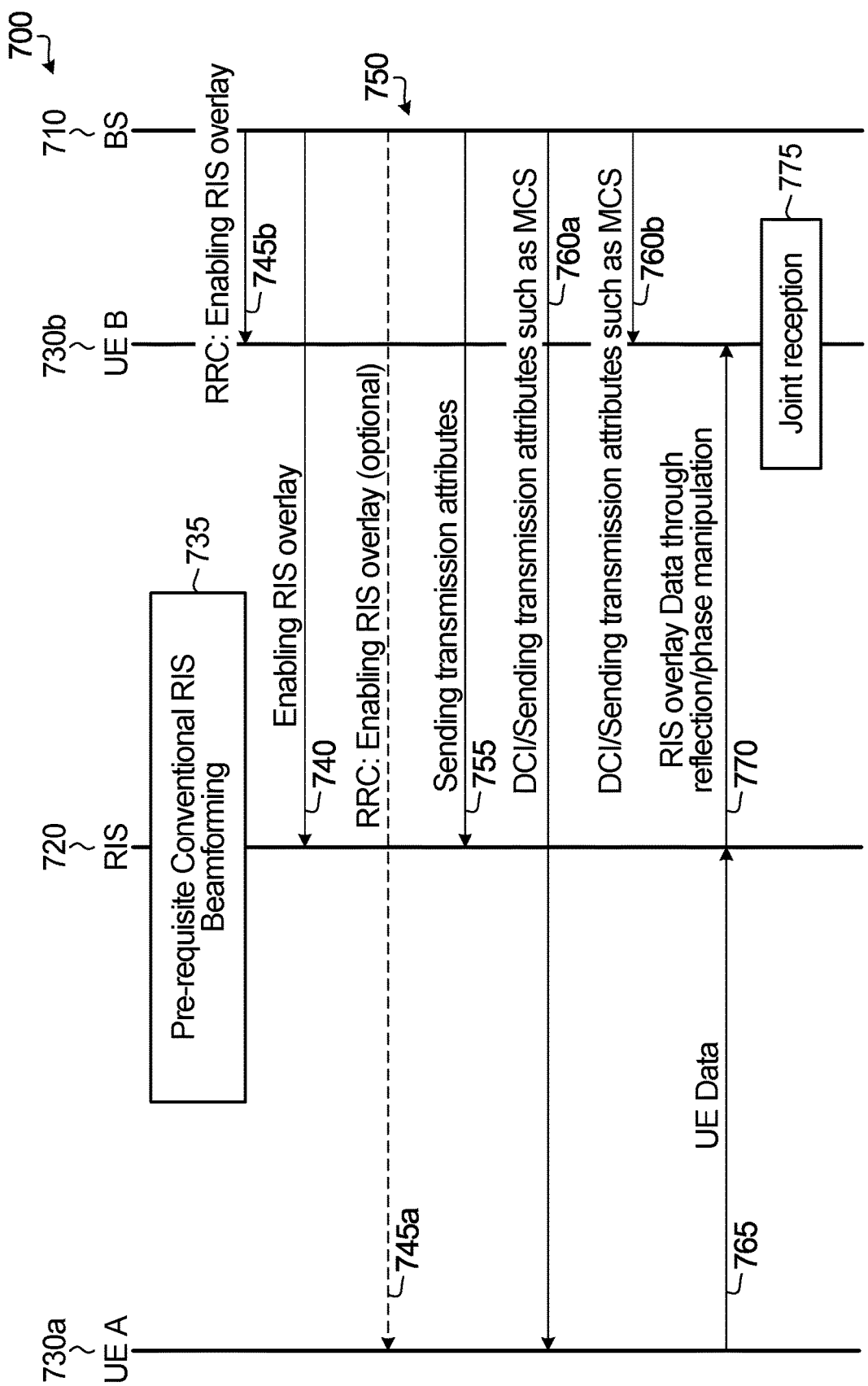
FIG. 7 is a signal flow diagram illustrating signaling between a base station, RIS and UE for configuring and data transmission for dynamic sidelink according to an aspect of the application.

FIG. 7 illustrates a signal flow diagram that details signalling between a base station 710, a first UE, UE A 730a, a second UE, UE B 730b, and a RIS 720 to enable network controlled dynamic sidelink RIS overlay. While the network is being described as controlling dynamic downlink RIS overlay, in some embodiments, the actions of the network are performed by the serving base station or possibly performed elsewhere in the network and provided to the RIS via the serving base station.

Measurements for channel estimation and beamforming configuration processes 735 are illustrated to already have been performed. The network enables the use of the RIS 720 to overlay additional data on a signal transmitted by the UE A 730a and redirected by the RIS 720 by RRC signalling 745b to the UE B 730b and signalling 740 to the RIS 720 via an auxiliary channel. Optionally, in some embodiments, the network may perform RRC signalling 745a to the UE A 730a to aid in enabling the use of the RIS 720 to overlay additional data on a signal transmitted by the UE B 730b. The network performs 750 scheduling and determines transmission attributes for SL transmission from UE A 730a to UE B 730b and a link between the RIS 720 and the UE B 730b. The network transmits 755 configuration information to the RIS 720 with beamforming and overlay transmission attributes via the auxiliary channel. The network sends 760a a DCI message to the UE A 730a including the SL attributes of the signal being transmitted by the UE A 730a. The network sends 760b one or two DCI messages to the UE B 730b including the SL attributes of the signal being transmitted by the UE A 730a and SL attributes for the RIS 720. One DCI could be used to send all SL attributes, or two DCI could be used to send SL attributes respective to the signal being transmitted by the UE A 730a and the SL attributes for the RIS 720. The UE A 730a sends 765 data with the assigned SL attributes beamformed to the RIS 720. The RIS 720 reflects 770 the signal sent by the UE A 730a while overlaying its own data using the assigned attributes. The UE B 730b decodes 775 the data from both the UE A 730a and RIS 720.

Embodiments that enable semi-static and opportunistic transmission strategies for SL, similar to those described above for DL, are also considered within the scope of the disclosure.

Embodiments that enable dynamic, semi-static and opportunistic transmission strategies for backhaul, similar to those described above for DL, are also considered within the scope of the disclosure.

For some embodiments pertaining to downlink, when the RIS is a separate node from the transmitter and the RIS does not receive control information directly from the transmitter, the RIS is connected to the network node by an auxiliary channel; e.g., through wire or wireless channel. In some embodiments, the transmission attributes to be used by the RIS are partially controlled by the network. Signalling details for the dynamic overlay case are described below.

Figure 8:
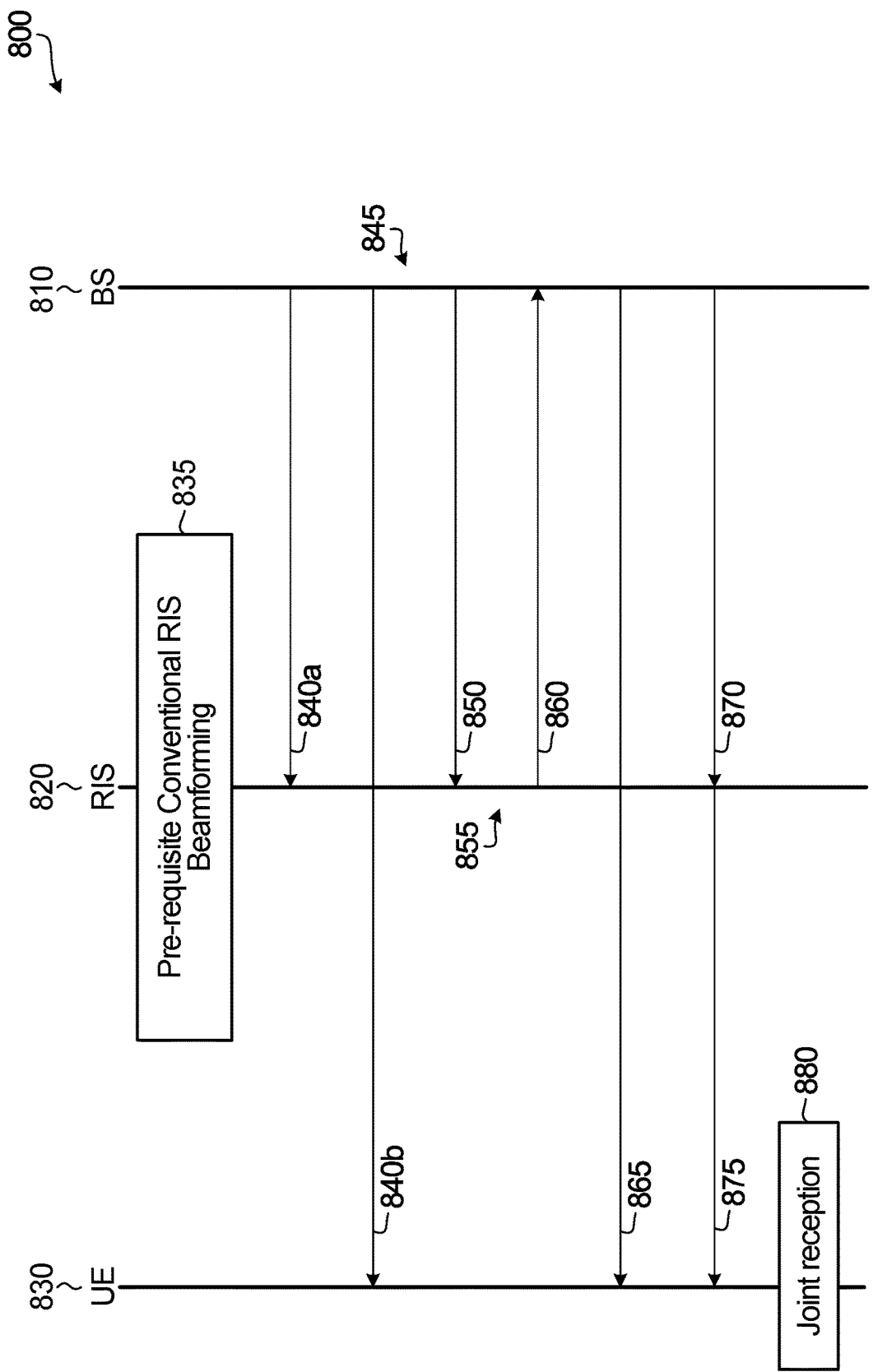
FIG. 8 is a signal flow diagram illustrating signaling between a base station, RIS and UE for configuring and data transmission for dynamic downlink according to another aspect of the application.

FIG. 8 illustrates a signal flow diagram that details signalling between a base station 810, a single UE 830 and a RIS 820 to enable partially controlled dynamic downlink RIS overlay. While only a single UE is included in the signal flow diagram, it is to be understood that multiple UEs and more than one RIS could be used in a cell. While the network is being described as partially controlling dynamic downlink RIS overlay, in some embodiments, the actions of the network are performed by the serving base station or possibly performed elsewhere in the network and provided to the RIS via the serving base station.

Measurements for channel estimation and beamforming configuration processes 835 are illustrated to already have been performed. The network enables the use of the RIS 820 to overlay additional data on a signal transmitted by the base station 810 and redirected by the RIS 820 by RRC signalling 840*b* to the UE 830 and signalling 840*a* to the RIS 820 through an auxiliary channel. The network performs 845 scheduling and determines transmission attributes for DL and a link between the RIS 820 and the UE 830. The network transmits 850 configuration information to the RIS 820 with beamforming and overlay transmission attributes via the auxiliary channel. The RIS 820 determines 855 the RIS layer attributes and informs 860 the network. The network sends 865 at least one DCI message to the UE 830 including the attributes of the both the original signal being transmitted by the base station 810 and a signal that is being overlaid on the original signal by the RIS 820. In some embodiments, the network may send two separate DCI messages, one DCI message having the attribute information for the original signal being transmitted by the base station 810 and one DCI message having the attribute information for the signal that is being overlaid on the original signal by the RIS 820. The network sends 870 data with the assigned DL attributes beamformed to the RIS 820. The RIS 820 reflects 875 the signal sent by the base station 810 while overlaying its own data using the assigned attributes. The UE 830 decodes 880 the data from both base station 810 and RIS 820.

This embodiment is similar to the DL dynamic overlay shown in FIG. 4 and described above, except that in this embodiment the RIS has partial control over the overlay process, as evidenced by the extra steps of 855 and 860 in FIG. 8. Is to be understood that for DL, the opportunistic, or on demand, and semi-static overlay process described above that are fully controlled by the network can also be modified for situations in which the RIS has partial control over the overlay process in a similar manner described above with regard to FIG. 8 in that the network transmits configuration information to the RIS with beamforming and overlay transmission attributes and the RIS determines RIS layer attributes and informs the network. Furthermore, UL, SL and backhaul process in which the RIS has partial control of the overlay process are also considered to be within the scope of this invention where in each of these scenarios the network transmits configuration information to the RIS with beamforming and overlay transmission attributes and the RIS determines RIS layer attributes and informs the network as part of the respective processes.

For embodiments pertaining to downlink, when the RIS is a separate node from the transmitter and the RIS can receive control information directly from the transmitter. In this case, the RIS would be able to receive the control signal directly. It may even be able to receive the same control signalling sent to the UE. In some embodiments, the transmission attributes to be used by the RIS are fully controlled by the network. Signalling details for the dynamic overlay case are described below.

Figure 9:
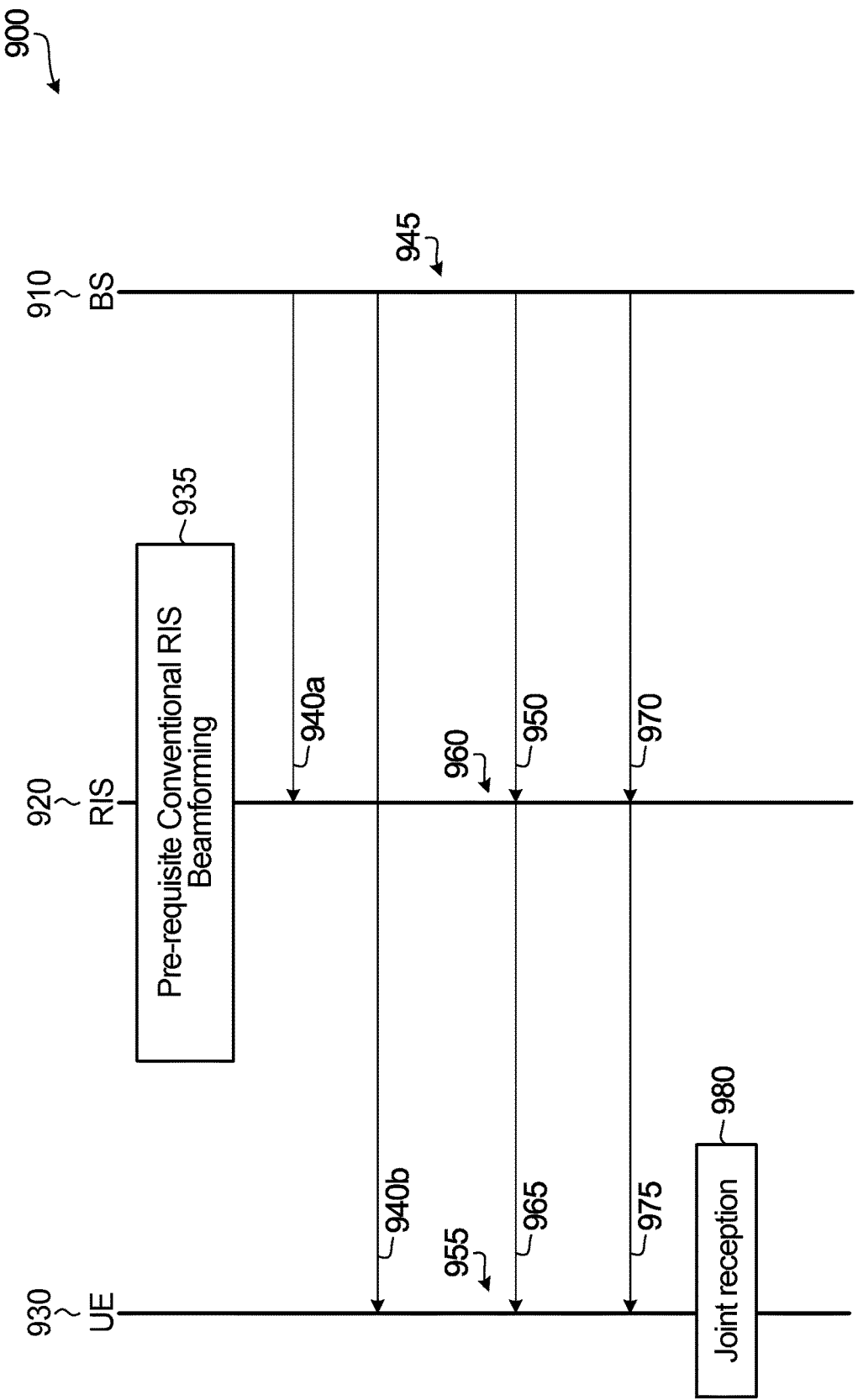
FIG. 9 is a signal flow diagram illustrating signaling between a base station, RIS and UE for configuring and data transmission for dynamic downlink according to a further aspect of the application.

FIG. 9 illustrates a signal flow diagram that details signalling between a base station 910, a single UE 930 and a RIS 920 to enable fully controlled dynamic downlink RIS overlay. While only a single UE is included in the signal flow diagram, it is to be understood that multiple UEs and more than one RIS could be used in a cell. While the network is being described as fully controlling dynamic downlink RIS overlay, in some embodiments, the actions of the network are performed by the serving base station or possibly performed elsewhere in the network and provided to the RIS via the serving base station.

Measurements for channel estimation and beamforming configuration processes 935 are illustrated to already have been performed. The network enables the use of the RIS 920 to overlay additional data on a signal transmitted by the base station 910 and redirected by the RIS 920 by RRC signalling 940*b* to the UE 930 and signalling 940*a* to the RIS 920. In general the UE may receive its signals through redirection by the RIS or through other links. In the case of signaling via the RIS, messages 940*a* and 940*b* may be combined into one signal. The network performs 945 scheduling and determines transmission attributes for DL and a link between the RIS 920 and the UE 930. The network sends 950,955 at least one DCI message to the UE 930, via the RIS 920 including the attributes of the both the original signal being transmitted by the base station 910 and a signal that is being overlaid on the original signal by the RIS 920. In some embodiments, the network may send two separate DCI messages, one DCI message having the attribute information for the original signal being transmitted by the base station 810 and one DCI message having the attribute information for the signal that is being overlaid on the original signal by the RIS 920. The RIS 920 decodes 960 the at least one DCI that is received and redirected to the UE 930. The UE 930 decodes 965 the at least one DCI that is received after being redirected to the UE 930 by the RIS 920. The network sends 970 data with the assigned DL attributes beamformed to the RIS 920. The RIS 920 reflects 975 the signal sent by the base station 910 while overlaying its own data using the assigned attributes. The UE 930 decodes 980 the data from both base station 910 and RIS 920.

This embodiment is similar to the DL dynamic overlay shown in FIG. 4 and described above, except that in this embodiment the RIS can receive the control signal directly OTA, instead of from the network via an auxiliary channel. Is to be understood that for DL, the opportunistic, or on demand, and semi-static overlay process described above that use the auxiliary channel instead of OTA, can also be modified for situations in which the RIS receives control information OTA in a similar manner described above with regard to FIG. 9. Furthermore, UL, SL and backhaul process in which the RIS receives control information OTA are also considered to be within the scope of this disclosure.

For some embodiments pertaining to downlink, when the RIS is a separate node from the transmitter and the RIS can receive control information directly from the transmitter. In this case, the RIS would be able to receive the control signal directly. It may even be able to receive the same control signalling sent to the UE. In some embodiments, the transmission attributes to be used by the RIS are partially controlled by the network and partially by the RIS. Signalling details for the dynamic overlay case are described below.

Figure 10:
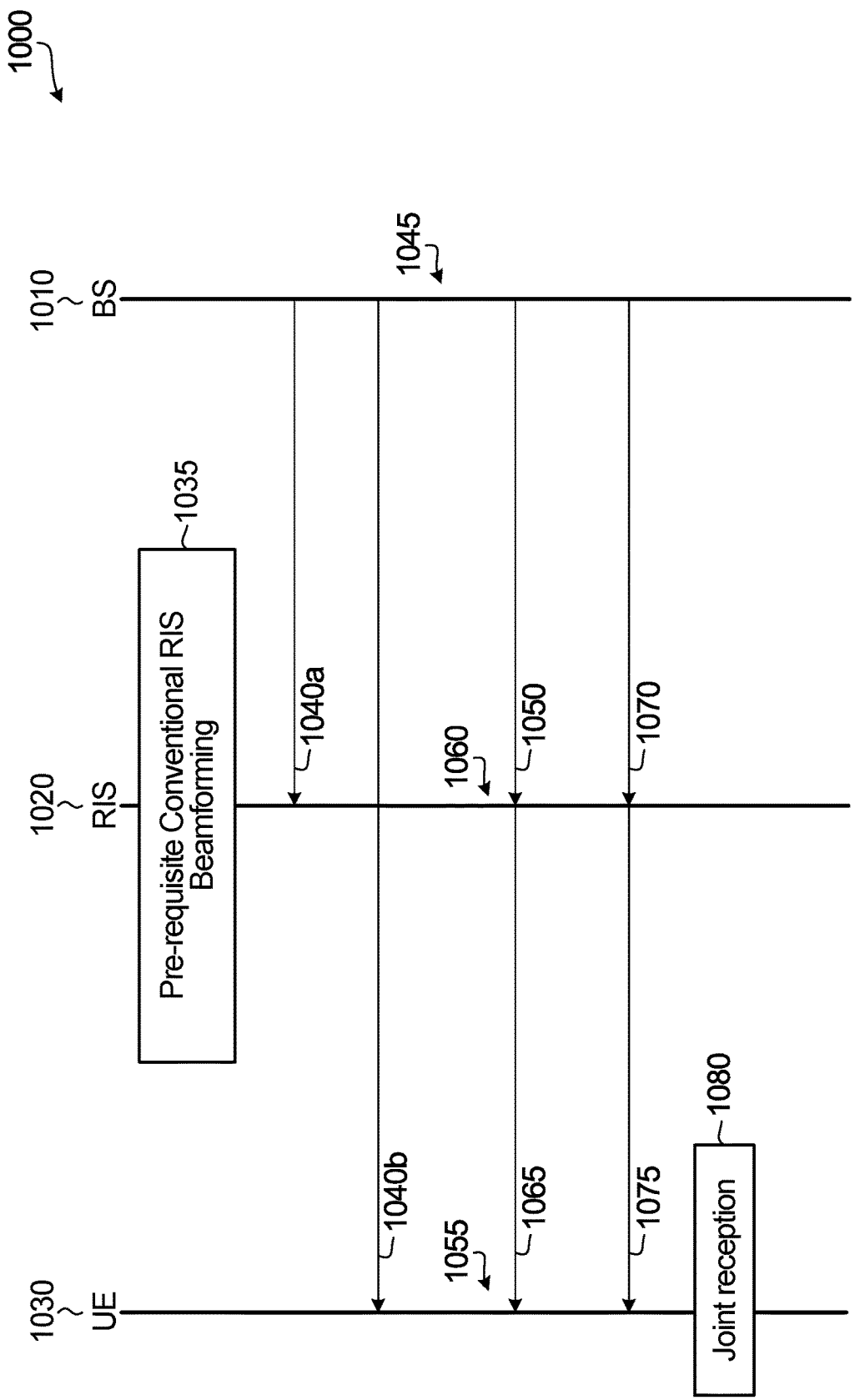
FIG. 10 is a signal flow diagram illustrating signaling between a base station, RIS and UE for configuring and data transmission for dynamic downlink according to yet another aspect of the application.

FIG. 10 illustrates a signal flow diagram that details signalling between a base station 1010, a single UE 1030 and a RIS 1020 to enable partially controlled dynamic downlink RIS overlay. While only a single UE is included in the signal flow diagram, it is to be understood that multiple UEs and more than one RIS could be used in a cell. While the network is being described as partially controlling dynamic downlink RIS overlay, in some embodiments, the actions of the network are performed by the serving base station or possibly performed elsewhere in the network and provided to the RIS via the serving base station.

Measurements for channel estimation and beamforming configuration processes 1035 are illustrated to already have been performed. The network enables the use of the RIS 1020 to overlay additional data on a signal transmitted by the base station 1010 and redirected by the RIS 1020 by RRC signalling 1040b to the UE 1030 and signalling 1040a to the RIS 1020. In this embodiment, the RIS 1020 may determine some of the RIS attributes, such as, but not limited to, the MCS and transmission length. The network performs 1045 scheduling and determines transmission attributes for DL and a link between the RIS 1020 and the UE 1030. The network sends 1050,1055 at least one DCI message to the UE 1030, via the RIS 1020 including the attributes of the both the original signal being transmitted by the base station 1010 and a signal that is being overlaid on the original signal by the RIS 1020. In some embodiments, the network may send two separate DCI messages, one DCI message having the attribute information for the original signal being transmitted by the base station 1010 and one DCI message having the attribute information for the signal that is being overlaid on the original signal by the RIS 1020. The RIS 1020 decodes 1060 the at least one DCI that is received and redirected to the UE 1030. The UE 1030 decodes 1065 at least one DCI that is received after being redirected to the UE 1030 by the RIS 1020. The network sends 1070 data with the assigned DL attributes beamformed to the RIS 1020. The RIS 1020 sends 1075 a preamble overlaying the DL signal (which it is reflected to the UE 1030) to inform the UE 1030 of the MCS and signal frame. The RIS overlay signal frame is a subset of the overall DL signal. In some embodiments, the set of possible preambles is given to the RIS 1020 and the UE 1030 by the network. For example, the UE 1030 is informed via RRC signalling and/or by other form of signalling. The RIS 1020 continues to reflect 1075 the remainder of the signal sent by the base station 1010 while overlaying any additional data using the assigned attributes. The UE 1030 decodes 1080 the data from both base station 1010 and RIS 1020.

This embodiment is similar to the DL dynamic overlay shown in FIG. 4 and described above, except that in this embodiment the RIS can receive the control signal directly OTA, instead of from the network via an auxiliary channel and the RIS partially controls the overlay process. Is to be understood that for DL, the opportunistic, or on demand, and semi-static overlay process described above that use the auxiliary channel instead of OTA and fully network controlled, can also be modified for situations in which the RIS receives control information OTA and the RIS partially controls the overlay process in a similar manner described above with regard to FIG. 10. Furthermore, UL, SL and backhaul process in which the RIS receives control information OTA are also considered to be within the scope of this disclosure.

Some of the embodiments and examples described above may also be applied to other applications and scenarios as well. For example, in the case of a satellite communication, the satellite might be communicating to a UE through an RIS such that the RIS beamforms the signal received from the satellite towards the UE while overlaying its data in the same time. Another possible example is vehicular communication. When there is Internet of Vehicle (IoV), it is possible that the vehicle receives some information wirelessly from a BS or another vehicle. The wireless signal might be beamformed by an RIS that may overlay data on this signal as well. For example, an RIS might overlay traffic data regarding traffic congestions or a nearby car accident. It can be also some advertising data as well. In general the above embodiments and examples can be applied to various wireless communication systems.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
    receiving, by a reconfigurable intelligent surface (RIS), first configuration information for enabling the RIS to redirect an incident signal by beamforming, wherein the incident signal comprises first data from a transmitter;
    receiving, by the RIS, second configuration information for controlling one or more elements of the RIS to overlay second data on the incident signal;
    receiving, by the RIS, the incident signal to be redirected to a receiver; and
    beamforming the incident signal to redirect the incident signal to the receiver based on the first configuration information and overlaying the second data on the incident signal comprising the first data based on the second configuration information.

2. The method of claim 1, wherein overlaying the second data on the incident signal comprises one of:
    modifying a phase shift of one or more configurable elements of the RIS to modulate at least one of amplitude, phase, frequency, or polarization of the incident signal in order to overlay the second data on the incident signal; or
    turning one or more configurable elements of the RIS on or off to modulate the amplitude.

3. The method of claim 1, wherein when the incident signal is for multiple different receivers, receiving the first configuration information comprises receiving configuration information for configuring the RIS so that different sets of configurable elements of the RIS simultaneously beamform the incident signal based on the first configuration information and overlay the second data on the incident signal based on the second configuration information; and simultaneously beamforming the incident signal and overlaying the second data on the incident signal comprises the different sets of configurable elements simultaneously beamforming the incident signal and overlaying the second data on the incident signal for the different receivers.

4. The method of claim 1 further comprising receiving a message enabling the overlay of the second data by the RIS.

5. The method of claim 1, wherein the overlay of the second data by the RIS occurs in a dynamic or a semi-static or an opportunistic manner.

6. The method of claim 1, wherein the RIS and a transmitter that generates the incident signal redirected by the RIS are collocated or part of a same device.

7. The method of claim 1, wherein the RIS is a separate and distinct network element than a transmitter that generates the incident signal redirected by the RIS.

8. The method of claim 7, further comprising:
the RIS determining some of the second configuration information; and
transmitting an indication to the network of the second configuration determined by the RIS.

9. The method of claim 1, wherein receiving the first and second configuration information occurs via active elements or auxiliary channels.

10. An apparatus comprising:
a reconfigurable intelligent surface (RIS) comprising a plurality of configurable elements capable of redirecting and modulating an incident signal that is incident on the plurality of configurable elements, wherein the incident signal comprises first data from a transmitter;
a processor; and
a computer-readable medium having stored thereon computer executable instructions that when executed cause the processor to:
receive first configuration information for enabling the RIS to redirect the incident signal by beamforming;
receive second configuration information for controlling one or more elements of the RIS to overlay second data on the incident signal;
receive the incident signal to be redirected to a receiver; and
beamform the incident signal to redirect the incident signal to the receiver based on the first configuration information and overlay the second data on the received incident signal based on the second configuration information.

11. The apparatus of claim 10, wherein overlaying the second data on the incident signal comprises one of:
modifying a phase shift of one or more configurable elements of the RIS to modulate at least one of amplitude, phase, frequency, or polarization of the incident signal in order to overlay the second data on the incident signal; or
turning one or more configurable elements of the RIS "on" or "off" to modulate the amplitude.

12. The apparatus of claim 10, wherein when the incident signal is for multiple different receivers, receiving the first configuration information comprises receiving configuration information for configuring the RIS so that different sets of configurable elements of the RIS simultaneously beamform the incident signal based on the first configuration information and overlay the second data on the incident signal based on the second configuration information; and simultaneously beamforming the incident signal and overlaying the second data on the signal comprises the different sets of configurable elements simultaneously beamforming the incident signal and overlaying the second data on the incident signal for the different receivers.

13. The apparatus of claim 10 further comprising receiving a message enabling the overlay of the second data by the RIS.

14. The apparatus of claim 10, wherein the overlay of the second data by the RIS occurs in a dynamic or a semi-static or an opportunistic manner.

15. The apparatus of claim 10, wherein the RIS is a separate and distinct network element than a transmitter that generates the incident signal redirected by the RIS.

16. The apparatus of claim 15, further comprising:
the RIS determining some of the second configuration information; and
transmitting an indication to the network of the second configuration determined by the RIS.

17. The apparatus of claim 10, wherein receiving the first and second configuration information occurs via active elements or auxiliary channels.

18. An apparatus comprising:
a processor; and
a computer-readable medium having stored thereon computer executable instructions that when executed cause the processor to:
receive first configuration information notifying the apparatus of attributes of a reconfigurable intelligent surface (RIS) used to overlay second data on an incident signal transmitted by a transmitter, wherein the incident signal comprises first data from a transmitter;
receive the incident signal that is redirected by the RIS and the second data overlayed on the incident signal by the RIS; and
decode the incident signal to recover the first information included in the incident signal transmitted by the transmitter and the second data overlaid on the incident signal by the RIS.

19. The apparatus of claim 18, wherein the computer executable instructions that when executed further cause the processor to receive a message notifying the apparatus that the RIS is enabled for use to overlay the second data.

20. The apparatus of claim 18, wherein the overlay of the second data occurs in a dynamic or a semi-static or opportunistic manner.

* * * * *

UNITED STATES PATENT AND TRADEMARK OFFICE
CERTIFICATE OF CORRECTION

PATENT NO. : 11,848,709 B2
APPLICATION NO. : 16/994079
DATED : December 12, 2023
INVENTOR(S) : Mostafa Medra et al.

It is certified that error appears in the above-identified patent and that said Letters Patent is hereby corrected as shown below:

In the Claims

At Column 27, Line 51 and 52, Claim 10:
"...received incident signal based on the second configuration information." should be -- incident signal based on the second configuration information. --

At Column 28, Line 49, Claim 18:
"...decode the incident signal to recover the first information..." should be -- decode the received incident signal to recover the first information --

Signed and Sealed this
Twenty-eighth Day of May, 2024

Katherine Kelly Vidal
Katherine Kelly Vidal
*Director of the United States Patent and Trademark Office*